US 11,700,848 B2

(12) United States Patent
Freed

(10) Patent No.: US 11,700,848 B2
(45) Date of Patent: Jul. 18, 2023

(54) APPARATUS FOR PERFUSION OF AN EXCISED ORGAN

(71) Applicant: Tevosol, Inc., Edmonton (CA)

(72) Inventor: Darren Freed, Edmonton (CA)

(73) Assignee: TEVOSOL, INC., Edmonton (CA)

( * ) Notice: Subject to any disclaimer, the term of this patent is extended or adjusted under 35 U.S.C. 154(b) by 566 days.

(21) Appl. No.: 16/763,745

(22) PCT Filed: Nov. 20, 2018

(86) PCT No.: PCT/CA2018/051474
§ 371 (c)(1),
(2) Date: May 13, 2020

(87) PCT Pub. No.: WO2019/095079
PCT Pub. Date: May 23, 2019

(65) Prior Publication Data
US 2020/0367488 A1 Nov. 26, 2020

Related U.S. Application Data

(60) Provisional application No. 62/588,727, filed on Nov. 20, 2017.

(51) Int. Cl.
*A01N 1/02* (2006.01)
(52) U.S. Cl.
CPC .................................. *A01N 1/0247* (2013.01)
(58) Field of Classification Search
None
See application file for complete search history.

(56) References Cited

U.S. PATENT DOCUMENTS

| 3,660,241 A | 5/1972 | Michielsen |
| 4,004,298 A | 1/1977 | Freed |
| 7,431,727 B2 | 10/2008 | Cole et al. |
| 7,572,622 B2 | 8/2009 | Hassanein et al. |
| 8,715,305 B2 | 5/2014 | Pate et al. |
| 2010/0322826 A1 | 12/2010 | Locascio et al. |

(Continued)

FOREIGN PATENT DOCUMENTS

| CN | 104039137 A | 9/2014 |
| CN | 104754938 A | 7/2015 |

(Continued)

OTHER PUBLICATIONS

International Search Report and Written Opinion dated Mar. 4, 2019, issued in international patent application No. PCT/ CA2018/ 051474 (7 pages).

(Continued)

*Primary Examiner* — William H. Beisner

(57) ABSTRACT

Disclosed is a device for supporting and connecting an excised organ (such as a heart, a pair of lungs, a kidney, or a liver) during ex vivo perfusion. The device includes a resilient and flexible sheet having a first portion for contacting and supporting the organ thereon, and a second portion comprising an opening for forming a connection between the organ and a conduit to allow fluid communication between the conduit and the organ. The device also includes a magnetic material embedded in the second portion of the sheet for magnetically securing the connection between the conduit and the organ.

20 Claims, 32 Drawing Sheets

(56) References Cited

U.S. PATENT DOCUMENTS

| | | | |
|---|---|---|---|
| 2010/0322862 A1 | 12/2010 | Locascio et al. | |
| 2014/0377849 A1 | 12/2014 | Kay et al. | |
| 2015/0342177 A1* | 12/2015 | Hassanein | C12M 29/10 |
| | | | 435/284.1 |
| 2016/0113269 A1* | 4/2016 | Woodard | A01N 1/0273 |
| | | | 435/284.1 |

FOREIGN PATENT DOCUMENTS

| | | |
|---|---|---|
| CN | 104770361 A | 7/2015 |
| CN | 106659151 A | 5/2017 |
| EP | 1062870 A2 | 12/2000 |
| EP | 1062870 B1 | 1/2003 |
| JP | H0889518 A | 4/1996 |
| WO | 2011/002926 A2 | 1/2011 |
| WO | 2013/106908 A1 | 7/2013 |
| WO | 2014/194349 A1 | 12/2014 |
| WO | 2016/090498 A1 | 6/2016 |

OTHER PUBLICATIONS

F. J. Sutherland and D. J. Hearse, "The Isolated Blood And Perfusion Fluid Perfused Heart", Cardiovascular Research—The Centre for Cardiovascular Biology and Medicine, The Rayne Institute, King's College, St Thomas' Hospital, London, UK; retrieved on Oct. 16, 2017 at https://www.southalabama.edu/ishr/help/hearse/ (18 pages).

Office Action dated Mar. 9, 2022 issued in Chinese patent application No. 201880074218.8 (13 pages).

Extended European Search Report dated Dec. 17, 2020, issued in European patent application No. 18879106.5 (8 pages).

Office Action dated Jul. 26, 2021 issued in Chinese patent application No. 201880074218.8 (17 pages).

* cited by examiner

APPARATUS FOR PERFUSION OF AN EXCISED ORGAN

CROSS-REFERENCE TO RELATED APPLICATIONS

This application is a U.S. National Phase Application under 35 U.S.C. 371 of International Application No. PCT/CA2018/051474 filed Nov. 20, 2018, which claims the benefit of, and priority from, U.S. Provisional Patent Application No. 62/588,727, filed Nov. 20, 2017, the entire contents of both prior applications being incorporated herein by reference.

FIELD

This disclosure relates generally to organ perfusion apparatus and methods, and particularly to apparatus and methods for supporting and connecting with an excised organ during ex vivo perfusion.

BACKGROUND

Organ perfusion is commonly used for ex vivo maintenance and transportation of excised organs (i.e. for maintenance of the organ while isolated from the body). A perfusion fluid (known as a 'perfusate') is used to supply oxygen and nutrients to the cells and tissues within the harvested organ, and to remove carbon dioxide and other waste. The excised organ is typically placed inside an organ chamber and connected at the primary artery or arteries to a fluid system. The fluid system supplies the organ with perfusate, which may pass through capillary beds in the organ and into the veins, and is then excreted from the organ's primary vein or veins.

For example, as illustrated in FIG. 1, in the typical 'hanging heart' method for perfusing an excised heart 101, the heart is hung inside an organ chamber 100. Aorta 102 of heart 101 is sutured with suture 106 to cannula 104 and vena cava 112 is sutured with suture 116 to cannula 114. Perfusate may flow to and from a fluid system (not shown) and in and out of the heart through tubes 142 and 144 which are coupled to cannulas 104 and 114, respectively. Pulmonary artery 134 may also be connected to cannula 136. As shown, cannula 136 is downward pointing, such that fluids can collect at base 138 of chamber 100 and drained through drain 132.

New apparatus, systems, and methods for supporting an excised organ during perfusion are desirable.

SUMMARY

In accordance with an aspect of the present disclosure, there is provided a device for supporting and connecting an excised organ during perfusion. The device includes a resilient and flexible sheet having a first portion for contacting and supporting the organ thereon, and a second portion comprising an opening for forming a connection between the organ and a conduit to allow fluid communication between the conduit and the organ; and a magnetic material embedded in the second portion of the sheet for magnetically securing the connection between the conduit and the organ.

In another aspect of the disclosure, the first portion includes a first material having a first Shore hardness value, and the second portion includes a second material having a second Shore hardness value, the first Shore hardness value being lower than the second Shore hardness value.

In another aspect of the disclosure, the first Shore hardness value is selected from 00-20 to 00-50 to allow the first portion of the sheet to conform to an external shape of the organ when the organ is supported on the sheet.

In another aspect of the disclosure, a section in the second portion of the sheet at the opening has a Shore hardness value higher than 0A, selected to limit distention of the section of the sheet under an applied fluid pressure in the opening.

In another aspect of the disclosure, the sheet comprises a silicone. In another aspect of the disclosure, different portions of the sheet include different silicone materials having different Shore hardness values.

In another aspect of the disclosure, the magnetic material includes particulate magnets or ferromagnetic particulates dispersed around the opening for magnetically attracting a magnetic connector attached to the organ.

In another aspect of the disclosure, the sheet includes a magnetic connector embedded in the sheet for coupling with an external magnetic connector.

In another aspect of the disclosure, the magnetic connector embedded in the sheet comprises a flange mounted on or connectable to the conduit.

In another aspect of the disclosure, the opening of the sheet includes a first opening for receiving an end of a cannula connected to the organ, a second opening for fluid communication therethrough, and a fluid channel in the sheet connecting the first opening and the second opening.

In another aspect of the disclosure, the sheet has a first side and a second side, the first opening is on the first side of the sheet and the channel extends between the first side and the second side within the sheet.

In another aspect of the disclosure, the second opening is at an edge of the sheet between the first side and the second side.

In another aspect of the disclosure, the sheet includes a throughhole to allow a fluid tubing to pass therethrough.

In another aspect of the disclosure, the sheet includes a reinforcing frame in the second portion, which may comprise a urethane material.

In another aspect of the disclosure, the organ is a heart, and the second portion of the sheet has a plurality of openings comprising a first opening for fluid communication with an aorta of the heart, a second opening for fluid communication with a pulmonary artery of the heart, and a third opening for fluid communication with an atrium of the heart.

In another aspect of the disclosure, the connection includes attachment of a cannula attached to the organ to a tubing attached to the sheet.

In some embodiments, a cannula attached to a sheet described herein by the connection may include a pressure sensor port for coupling with a pressure sensor, or may include an integrated pressure sensor in the cannula. During use, the pressure sensor may be used to detect or measure a pressure in the fluid channel of the cannula and thus the corresponding pressure at a part of the organ that is connected to the cannula.

In another aspect of the disclosure, the sheet may be mounted inside a chamber, the chamber including a plurality of ports for connecting a plurality of fluid conduits to the organ supported on the sheet.

In another aspect of the disclosure, the chamber comprises a plurality of mounting posts having different heights, and the sheet is mounted on the mounting posts and is inclined such that the first portion is lower than the second portion.

In another aspect of the disclosure, there is provided a kit comprising the support device and a set of external magnetic connectors each configured for connecting with a respective cannula. The kit may include a first connector for connecting with an artery of a heart, and a second connector for connecting with an atrium of the heart, and a third connector for connecting with an aorta of the heart.

Other aspects, features, and embodiments of the present disclosure will become apparent to those of ordinary skill in the art upon review of the following description of specific embodiments in conjunction with the accompanying figures.

BRIEF DESCRIPTION OF DRAWINGS

In the figures, which illustrate, by way of example only, embodiments of the present disclosure.

DETAILED DESCRIPTION

Figure 1:
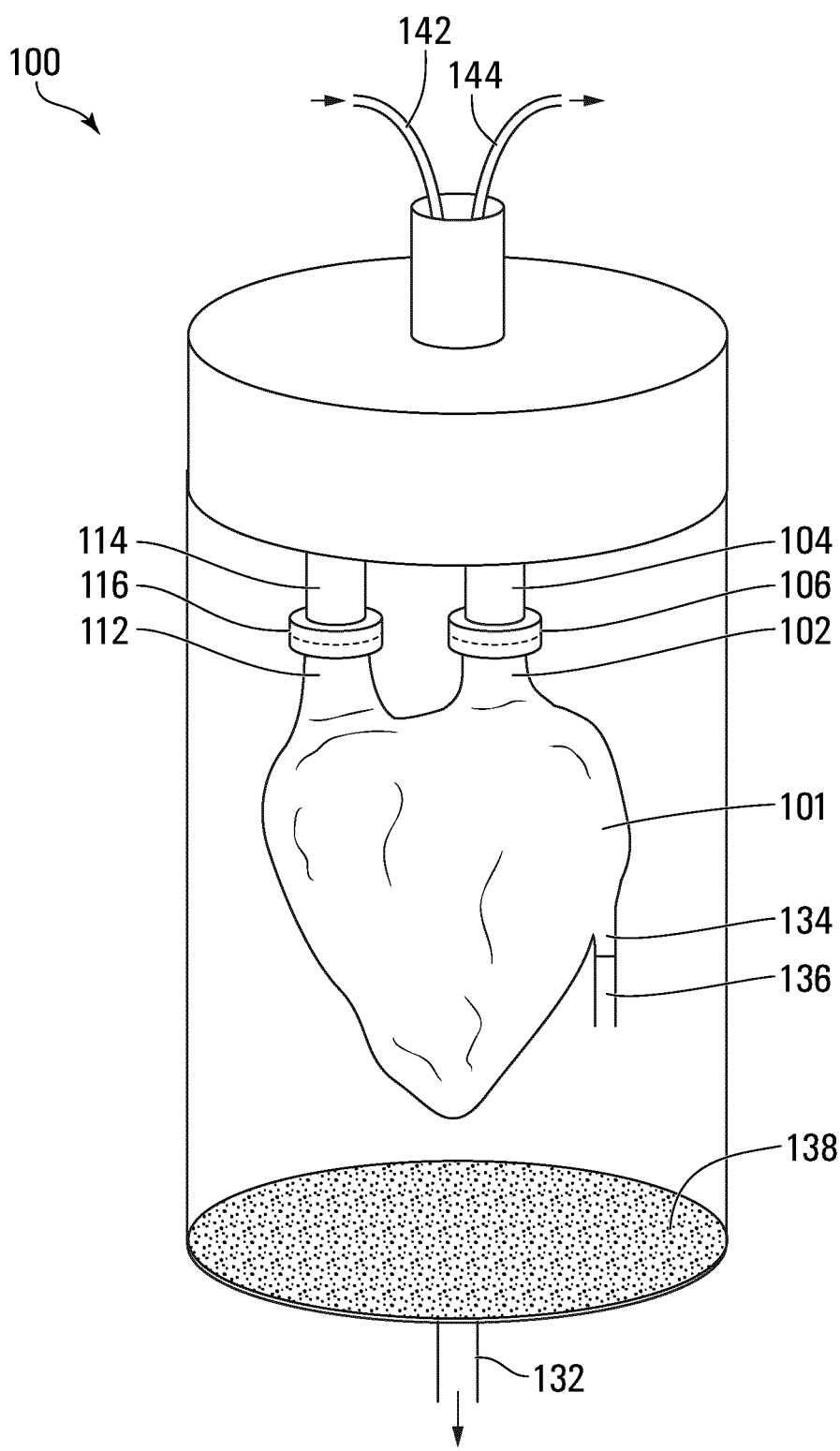
FIG. 1 is a schematic view of a prior art system for perfusing a heart.

It has been observed that conventional organ chambers do not provide an environment that mimics the natural environment inside the body and can produce excessive stress on an excised organ under perfusion such as when a heart is perfused with the "hanging heart" method. Excised organs may thus suffer tissue damage as a result. For example, excessive stress can be generated by the weight of the heart when the heart is hung, as illustrated in FIG. 1. The hanging of an excised heart using the hanging heart method can add mechanical stress to the arteries or veins of the heart as the weight of the heart is supported by the arteries or veins. The mechanical stress may extend to the entire heart and may cause tissue damage. Further, there is a risk that the cannulation of the arteries or veins may fail, which may lead to disconnection of the heart from the perfusion apparatus, which in turn can lead to catastrophic results.

It has also been observed that it may be inconvenient to connect an excised organ to a fluid system using conventional connection techniques used for existing fluid systems. For example, it is time consuming to attach a cannula to an organ by suturing. Repeated attachment and detachment of the cannula to an artery or vein, which may be required to change the mode of perfusion, also increases risk of tissue damage. For example, an excised heart may be perfused in a "resting mode" or a "working mode," which may require re-configuration of perfusion circuit and disconnection and reconnection of the sutured connections to the heart. Further, reconfiguration of the perfusion circuit and the connections to the organ may be necessary for other reasons. The organ may also need to be reoriented in the organ chamber during perfusion. When reconfiguration of the connections to the perfused organ requires removal of the sutures and re-suturing to a different cannula, the disconnecting and re-connecting process can be time-consuming and lead to increased risk of tissue damage.

It has been realized by the present inventor that a support device as disclosed herein can be conveniently used to support an excise organ and provide for quick connection to arteries and veins of the excised organ (such as a heart, lungs, a liver, or a kidney) for or during ex vivo perfusion of the organ.

In an example embodiment, the support device includes a resilient and flexible sheet to support the organ thereon during perfusion. The sheet may include a soft portion, on which the organ may rest. The soft portion may be made of a material that conforms to the external shape of the organ, which may avoid some mechanical stresses that are typically placed on the organ during a conventional perfusion process. The sheet material may be selected so that the organ is supported in a way that mimics the way the organ is supported naturally in vivo.

Further, the sheet may include one or more connectors that allow the organ to be quickly placed in fluid communication with a fluid system. For example, the sheet may include one or more magnetic couplers. The sheet may also include one or more mechanical couplers or connectors.

The connector may have a conduit in fluid communication with a fluid system, allowing for quick connection to the fluid system.

In an embodiment, the sheet has a magnetic coupler for coupling to an external magnetic connector. The external magnetic connector may be attached to an artery or vein of an excised organ, for example by suturing. The magnetic coupler has a conduit which can be placed in fluid communication with a fluid system. The magnetic coupler includes a magnetic or ferromagnetic material embedded within the sheet for magnetically coupling to the external magnetic connector, thereby creating a fluid-tight seal between the external magnetic connector and the magnetic coupler. Thus, external magnetic connectors may easily and quickly connect to the conduit, thereby placing the excised organ in fluid communication with the fluid system. The magnetic coupler allows easy and quick reconfiguration, disconnection and reconnection, without the need to remove suturing or to re-suture. Notably, the sutures coupling the external magnetic connector to the artery or vein do not need to be removed and re-sutured to reconfigure the organ. Instead, the external magnetic connector may be de-coupled from the magnetic connector then coupled to the same or another magnetic connector. The magnetic connection also allows convenient alignment and sealing of the fluid conduits, and securing of the connection without the need to use other tightening mechanisms such as threaded connection or clamps. The magnetic coupler may be conveniently embedded in the supporting sheet as will be further described below.

In an embodiment, the sheet also includes a mechanical coupler coupled to a cannula. During use, the cannula coupled to the mechanical coupler may be attached to an artery or vein of an excised organ. A flanged rim of the cannula may be encapsulated within the sheet during a molding process. The mechanical coupler has a channel which can be placed in fluid communication with a fluid system. The channel wall of the mechanical coupler may be made of a material that mimics the natural resistance of an artery or vein inside the human body, thereby providing the excised organ with an environment that more closely mimics the natural environment within the body.

Figure 2A:
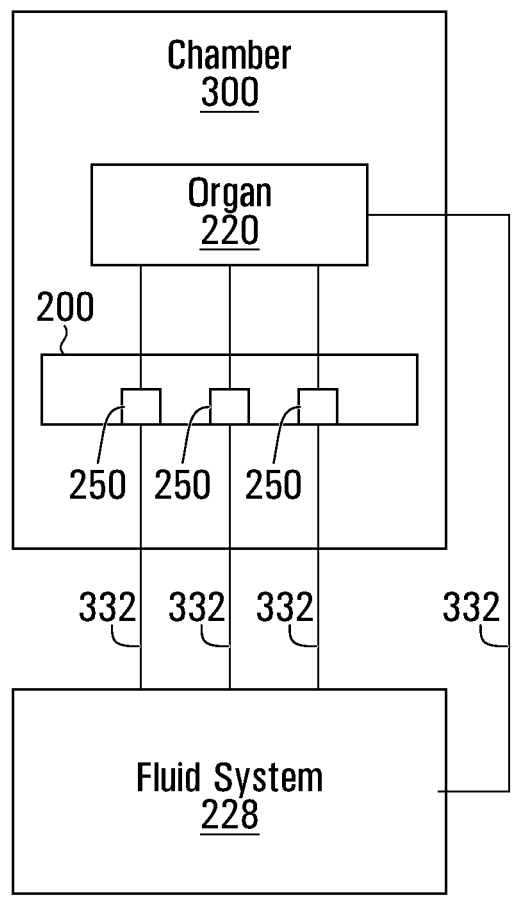
FIG. 2A is a block diagram illustrating schematically a support device mounted in a perfusion chamber and coupled to a fluid system in accordance with an example embodiment.
Figure 2B:
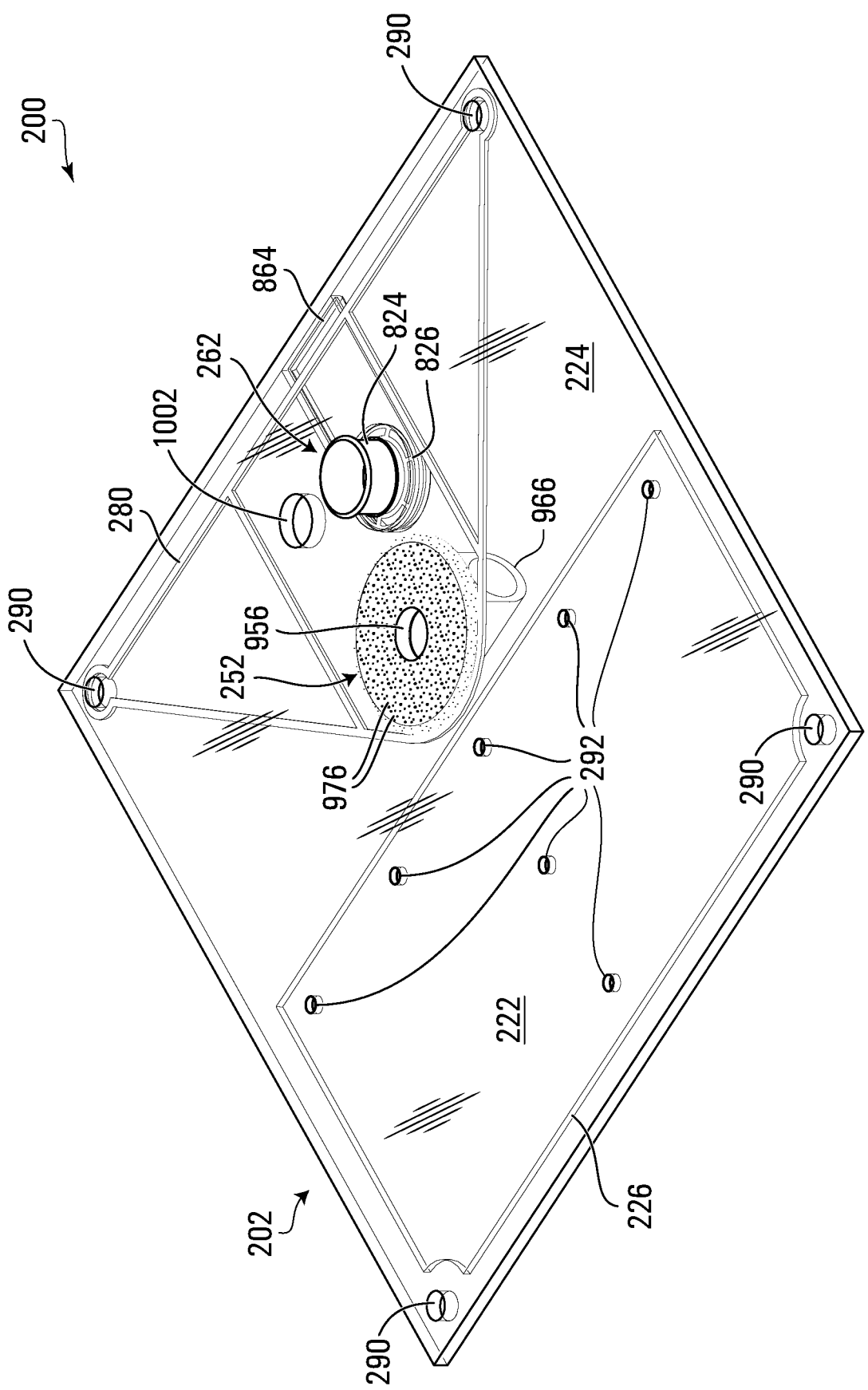
FIG. 2B is top, front and right perspective view of an example embodiment of the support device of FIG. 2A.
Figure 2C:
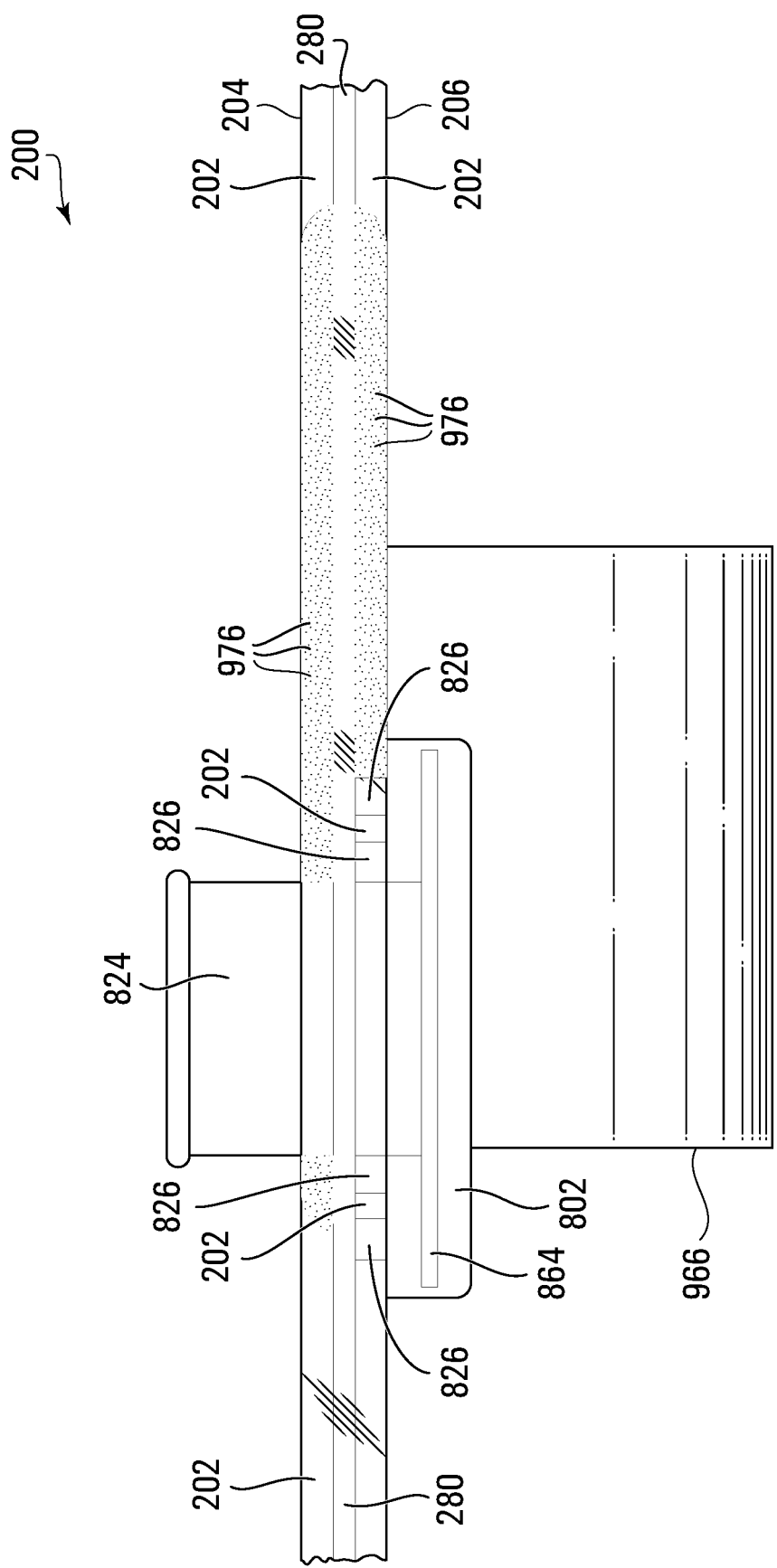
FIG. 2C is a rear elevation view of the support device of FIG. 2B.
Figure 2D:
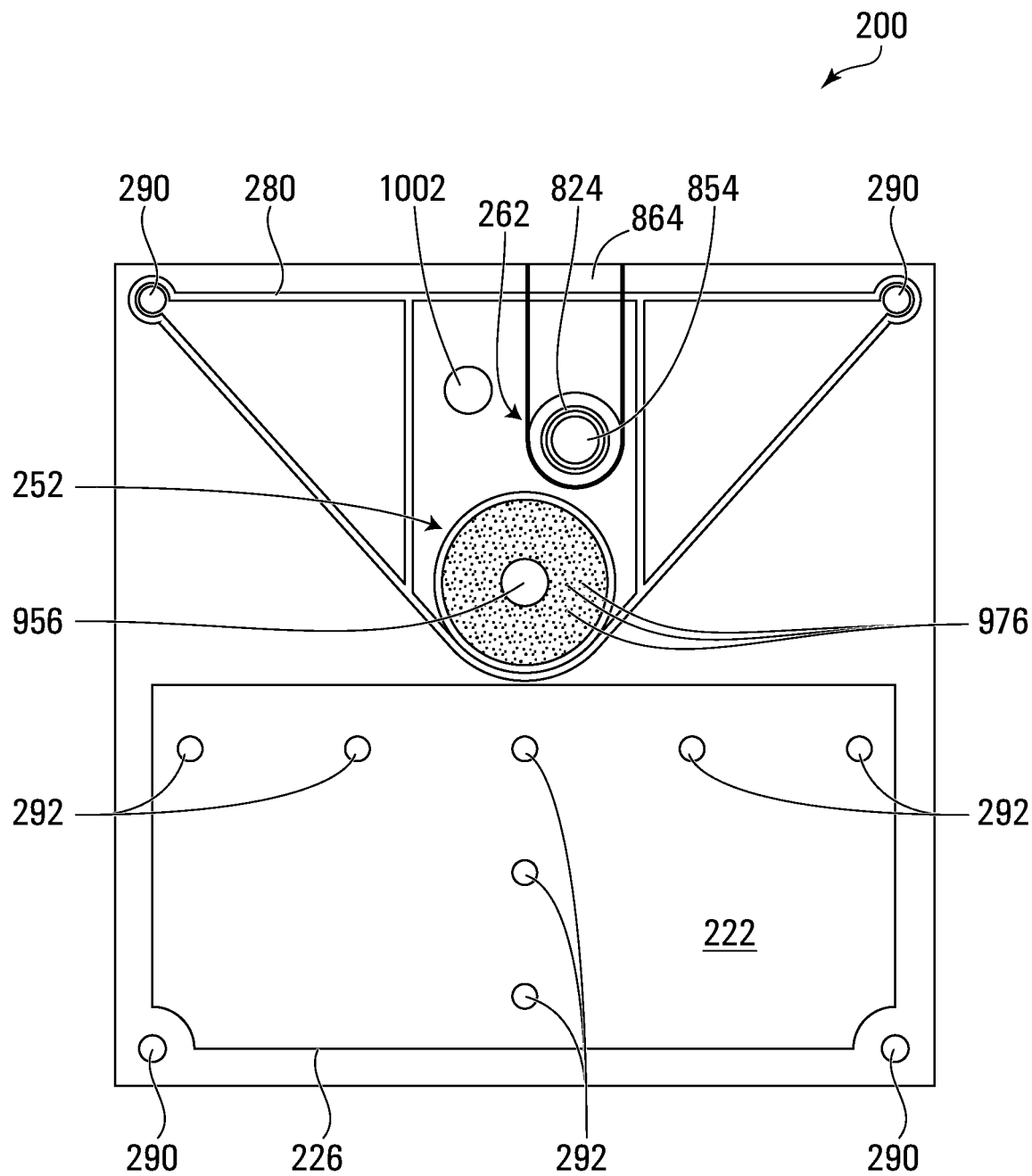
FIG. 2D is a top plan view of the support device of FIG. 2B.
Figure 2E:
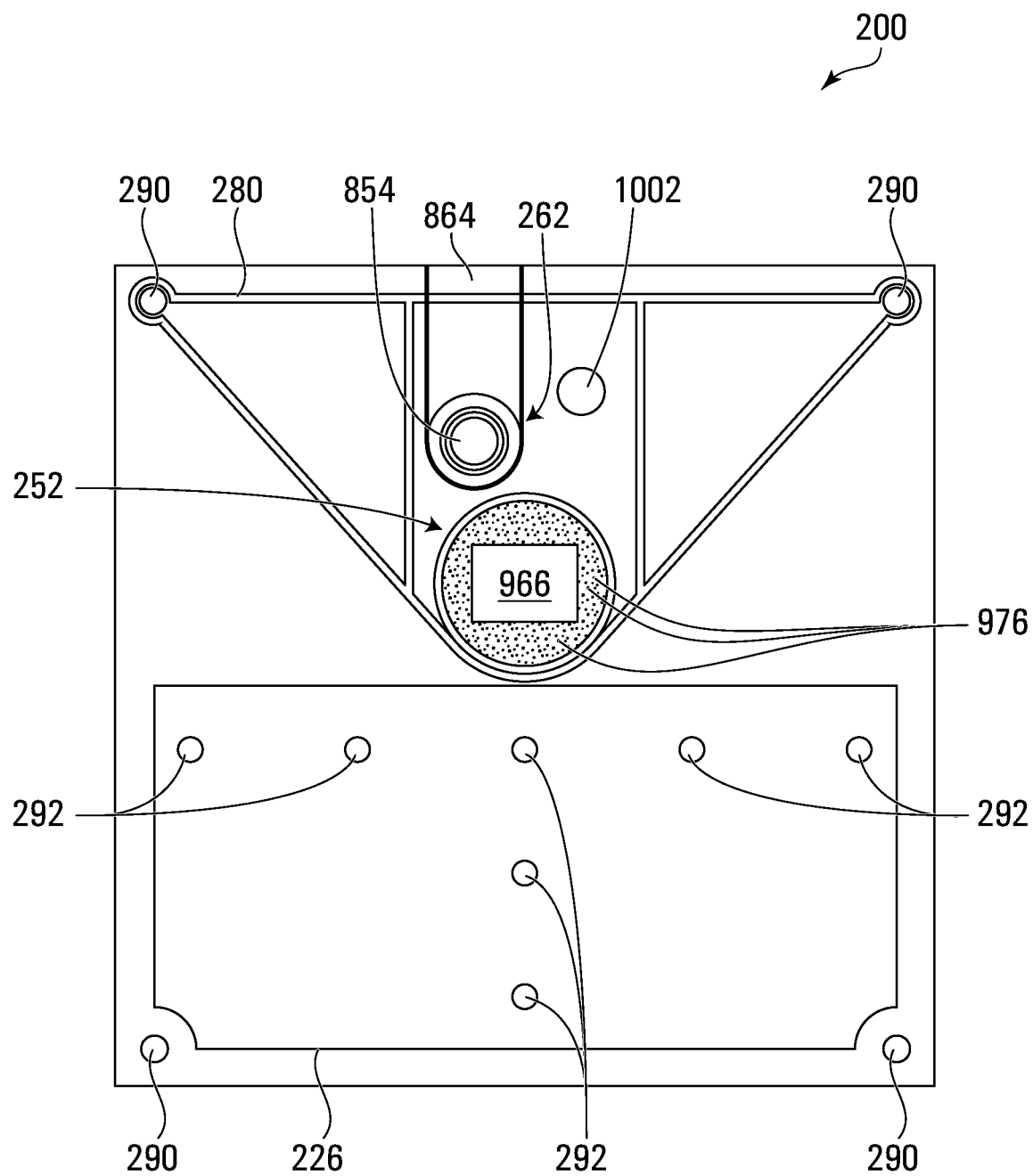
FIG. 2E is a bottom plan view of the support device of FIG. 2B.
Figure 2F:
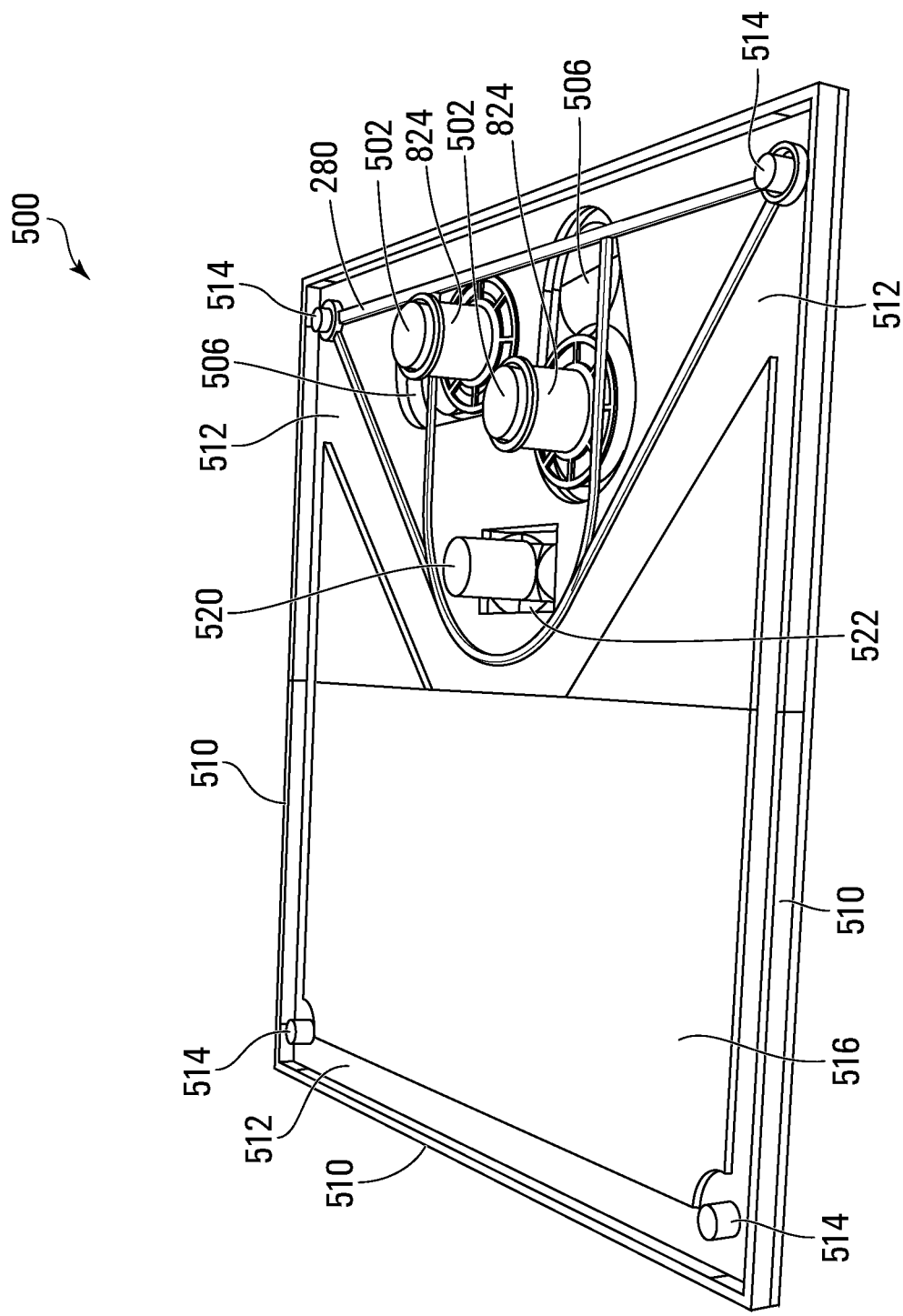
FIG. 2F is a top, front and right perspective view of an example mold for making the support device of FIG. 2B.
Figure 2G:
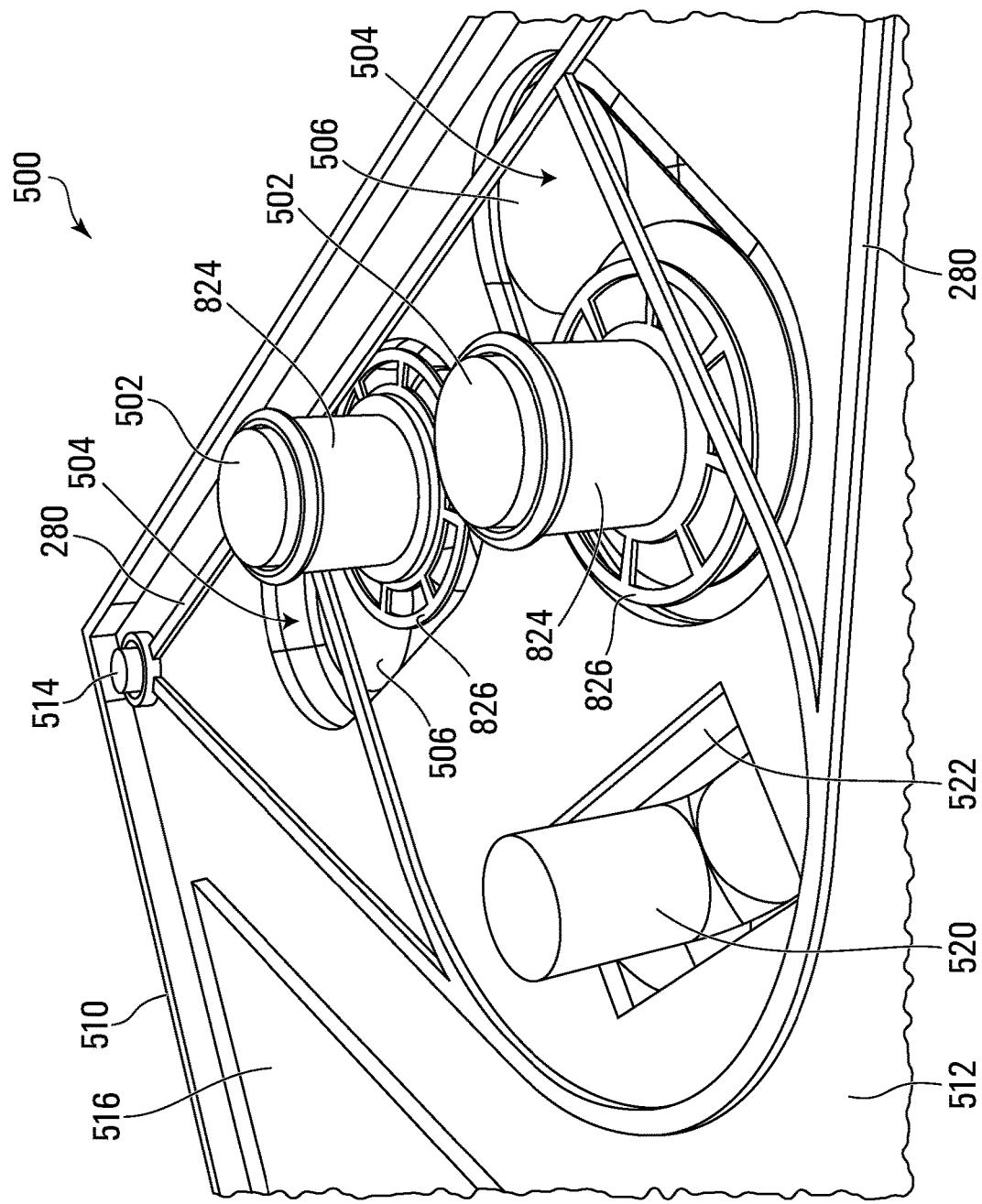
FIG. 2G is a partial top, front and right perspective view of the example mold of FIG. 2F.

Reference is now made to FIG. 2A, illustrating schematically a support device 200 mounted in an organ perfusion chamber 300 and coupled to a fluid system 228 for perfusing excised organ 220, in accordance with an example embodiment. Support device 200 is mounted inside perfusion chamber 300 and supports organ 220 on an upper side thereof. Arteries and veins of organ 220 are placed in fluid communication with fluid system 228 for perfusing organ 220.

As depicted in FIG. 2A, support device 200 includes three connectors 250, each placed in fluid communication with fluid system 228 through a conduit 332. However, in different embodiments the number of connectors 250 on the support device may vary. An artery or vein of organ 220 may also be connected to fluid system 228 directly (i.e. without interfacing through support device 200), or via a connector 250.

FIGS. 2B-2E illustrate an example embodiment of support device 200. In this embodiment, device 200 includes a resilient and flexible sheet 202 having a soft portion 222 and a rigid portion 224. Soft portion 222 of sheet 202 is configured for contacting and supporting the organ thereon on an upper side 204 of sheet 202. The rigid portion 224 is more rigid than the soft portion 222 but may still be somewhat resilient and flexible. That is rigid portion 224 may be semirigid. The soft portion 222 also still has sufficient strength and rigidity to provide the desired support for the organ.

Rigid portion 224 has at least one connector 250 for forming and securing a connection between the organ (not shown) and a conduit to allow for fluid communication between the conduit and the organ. In one embodiment as depicted, rigid portion 224 of sheet 202 includes a magnetic coupler 252, a mechanical coupler 262, and a throughhole 1002 (which are also collectively referred to as "connectors 250").

Magnetic coupler 252 is configured to allow for fluid communication between an organ (not shown) and conduit 966. Magnetic coupler 252 includes magnetic or ferromagnetic particulates 976, such as iron dust, embedded in rigid portion 224 of sheet 202 around opening 956 of rigid portion 224. Opening 956 is in fluid communication with conduit 966. Conduit 966 is attached to lower side 206 of sheet 202 and can be coupled to fluid system 228 (see FIG. 2A) using a conduit 332 (FIG. 2A).

Magnetic coupler 252 may be magnetically coupled to an external magnetic connector, which, for example, may be any of the magnetic connectors 400, 400', 400" described below and illustrated in FIGS. 5A-7C. External magnetic connector 400 may be secured to an artery or vein of an organ (e.g. by suturing) prior to, or after, coupling to magnetic coupler 252. External magnetic connector 400 includes a magnet that couples with particulates 976 to bias magnetic coupler 252 and magnetic connector 400 towards each other to secure the connection. When the magnetic coupling is strong enough, a fluid-tight seal may be formed, so that a fluid may flow through the connection without leaking.

Figure 8A:
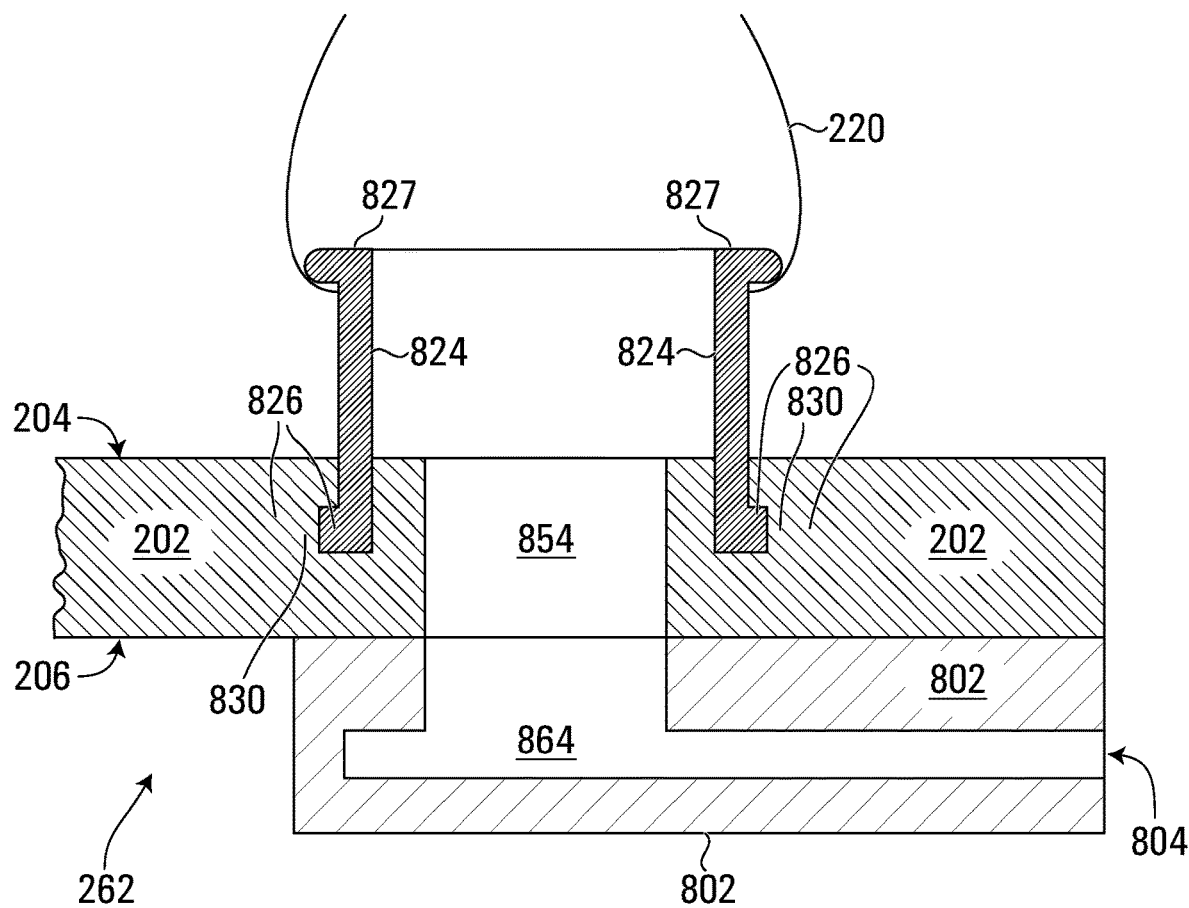
FIG. 8A is a cross-section view of a mechanical coupler of the support device of FIG. 2B coupled to a cannula in accordance with an example embodiment.

Mechanical coupler 262 is configured to allow for fluid communication between an organ (not shown) and channel 864. In one embodiment, mechanical coupler 262 includes a cannula 824 with a flanged end 826 (as shown in FIGS. 8F-8G) coupled to rigid portion 224, as illustrated in FIG. 8A. Flanged end 826 of cannula 824 may be encapsulated within sheet 202 during a molding process.

Alternatively, cannula 824 may be mechanically coupled to sheet 202. Mechanical coupler 262 may include a mechanical coupling mechanism, such as a circular groove with a lip around opening 824 for coupling flanged end 826 of cannula 824 to rigid portion 224 of sheet 202.

Cannula 824 is in fluid communication with opening 854, and opening 854 is in fluid communication with a fluid channel 864. Channel 864 can be coupled to fluid system 228 using a conduit 332 (see FIG. 2A). Channel 864 may be provided in a layer 802 of sheet 202 molded to the lower side 206 of sheet 202 (see FIG. 2C). In alternative embodiment, a fluid channel 864' in fluid communication with opening 854 may be embedded in rigid portion 224 of sheet 202 as illustrated in FIG. 8E.

Throughhole 1002 is provided and configured to allow a fluid tubing to pass through sheet 202, where the fluid tubing allows fluid communication to or from the supported organ through sheet 202.

Accordingly, one or more veins and/or arteries of the organ resting on soft portion 222 can be coupled to the fluid system via one or more of connectors 250, thereby allowing for quick attachment and reconfiguration of the connection of the supported organ to fluid system 228.

The selection of the implementation, number, positioning, and size of the connectors 250 may vary in various embodiments.

The number of connectors 250 provided in rigid portion 224 of sheet 202 may vary in dependence on the type of organ (e.g. a heart, lungs, kidney, and liver) that sheet 202 is configured to support. For example, three or four connectors 250 may be provided for perfusion of a heart, as will be explained. Similarly, two or three connectors 250 may be provided for perfusion of a pair of lungs, a kidney, or a liver.

Connectors 250 are generally positioned in rigid portion 224 of sheet 202 to allow for a connector 250 to couple to a specific vein or artery of a specific organ type to be supported on sheet 202. The connectors 250 may further be arranged to be close to the respective locations of the corresponding veins and arteries of the particular organ type to be supported, taking into consideration the position and size of the organ when it is supported on sheet 202. Further, in some embodiments, the median or average metrics of the size and position of the veins and arteries of the specified organ type may be used in determining the relative positioning of the respective connectors 250 on sheet 202 with respect to one another. In other embodiments, a custom sheet 202 may be made for a particular organ by obtaining exact measurements for a particular organ using imaging techniques and using the measurements to determine the positioning of the connectors 250 on sheet 202 relative to one another.

In one embodiment, an embedded reinforcing frame 280 is provided on rigid portion 224 of sheet 202 to provide increased rigidity. Further, reinforcing frame 280 may conveniently elevate rigid portion 224 and connectors 250 relative to the soft portion 222, thereby bringing connectors 250 closer to the veins and arteries of the supported organ on the soft portion 222 of sheet 202. The elevated rigid portion 224 may also help to reduce accumulation (pooling) of blood or the perfusion fluid at the bottom of the supported organ, and allow better drainage of fluids towards the lower edge of sheet 202. In some embodiments, soft portion 222 may also include perforations 292 to allow fluids to drain through sheet 202.

Further, frame 280 may aid in de-airing the heart. For example, to complete de-airing of the heart, the heart is optimally positioned with the aorta elevated relative to the pulmonary veins (which are connected to the left atrium). During use, the heart may be slowly filled with a perfusate through the left atrium, which is placed at the lowest level. When the liquid level slowly rises up within the heart, air within the heart is pushed out through the elevated aorta. Once the heart is fully filled with the perfusate, the aorta may be connected to fluid system 228.

In some embodiments, reinforcing frame 280 may include beams arranged in a triangle. The connectors 250 may generally be positioned inside the frame 280 (e.g. inside the triangle formed by frame 280) such that connectors 250 remain elevated during use with an organ resting on sheet 202. In one example, one of the beams of the triangular frame may extend along an edge of sheet 202, and the other two beams may extend from the respective corners on this edge of sheet 202 diagonally across rigid portion 224 of sheet 202 towards a central section of sheet 202 within rigid portion 224 and connect with one another at the central section. Frame 280 may also include additional beams or bars to provide additional support. Further, it will be appreciated that frame 280 may be shaped and configured differently in different embodiments.

In some embodiments, reinforcing frame 280 may be made of a flexible polyurethane material. The flexible polyurethane material may be more rigid than rigid portion 224 of sheet 202. Other materials that are biocompatible and are stiffer than rigid portion 224 of sheet 202 may also be suitable in different embodiments.

Soft and rigid portions 222, 224 of sheet 202 may be made, at least in part, of a silicone material. Different portions of sheet 202 may be made of different silicone materials having different Shore hardness values. Additionally or alternatively, different thicknesses of the same silicone material may be used. Sheet 202 may be formed of a single layer by any suitable process such as molding or extrusion processes. Sheet 202 may also be formed of multiple layers bonded to one another, and various components such as iron dusts or magnets may be sandwiched between two adjacent layers.

In one embodiment, soft portion 222 of sheet 202 is made at least in part of a material having a low Shore hardness. The low Shore hardness value of soft portion 222 of sheet 202 allows soft portion 222 to conform to the external shape of the organ when the organ is supported on the sheet, while still providing sufficient support. In one embodiment, the Shore hardness value of soft portion 222 of sheet 202 is selected from the range of 00-20 to 00-50. One example of such a material is the Ecoflex® cured silicone rubber manufactured by Smooth-On, Inc. In other words, soft portion 222 of sheet 202 is made, at least in part, of a material classified as being an extra-soft material. Other materials that are biocompatible and have a similar Shore hardness value may also be suitable for use with soft portion 222 of sheet 202.

In one embodiment, a section of rigid portion 224 of sheet 202 at the connectors 250 is made, at least in part, of a material having a Shore hardness value that is greater than that of soft portion 222. The higher Shore hardness value is selected to limit distention of the section of rigid portion 224 of sheet 202 at the connectors 250 under an applied fluid pressure during operation. In one embodiment, the Shore hardness value of the section of rigid portion 224 of sheet 202 at the connectors 250 is selected from the range of 0A to 2A. One example of such a material is the Dragon Skin® FX-Pro silicone rubber manufactured by Smooth-On, Inc. In other words, the section of rigid portion 224 of sheet 202 at the connectors 250 is made, at least in part, of a material classified as being a soft material. Other materials that are biocompatible and have a similar Shore hardness value may also be suitable for use with rigid portion 224 of sheet 202.

In one embodiment, sheet 202 is made of one or more types of silicone material having an indent 226 to define soft portion 222. Indent 226 reduces the thickness of the silicone material within the soft portion 222, thereby increases the softness of this portion of the sheet 202 and allows this sheet portion to conform more easily to the external shape of the supported organ. Indent 226 may be defined in a mold used to make sheet 202.

Rigid portion 224 may therefore be thicker and less soft as compared to soft portion 222. A thicker, more rigid portion 224 can provide more stable connection between the organ and the connected conduits or fluid system. Further, the increased thickness of rigid portion 224 allows more convenient inclusion and configuration of magnetic or other couplers or connecters, fluid channels, and reinforcing frame, or other components and features within the rigid portion, and allows attachment of other devices such as conduits or tubings and valves, sensors or the like to sheet 202. For example, some of these components may be embedded inside the rigid portion 224 of sheet 202. In one example, the soft portion 222 of sheet 202 has a thickness of 2 mm, while the rigid portion 224 of sheet 202 has a thickness of 4 mm.

In one embodiment, sheet 202 is configured for use with perfusion of a heart and has a length of 22 cm and a width of 22 cm and has a soft portion (for example, as defined by indent 226) having a length of 20 cm and a width of 10 cm.

In one embodiment, sheet 202 may include a rim (not shown) around the edges thereof, which may be made of a relatively thick silicone, to prevent the sheet from tearing during use and storage. The rim may be made of a thicker edge of the silicone or rubber material, such as that used for the rigid portion 224 of sheet 202, or alternatively, a polyurethane material, such as that used for reinforcing frame 280.

Figure 3A:
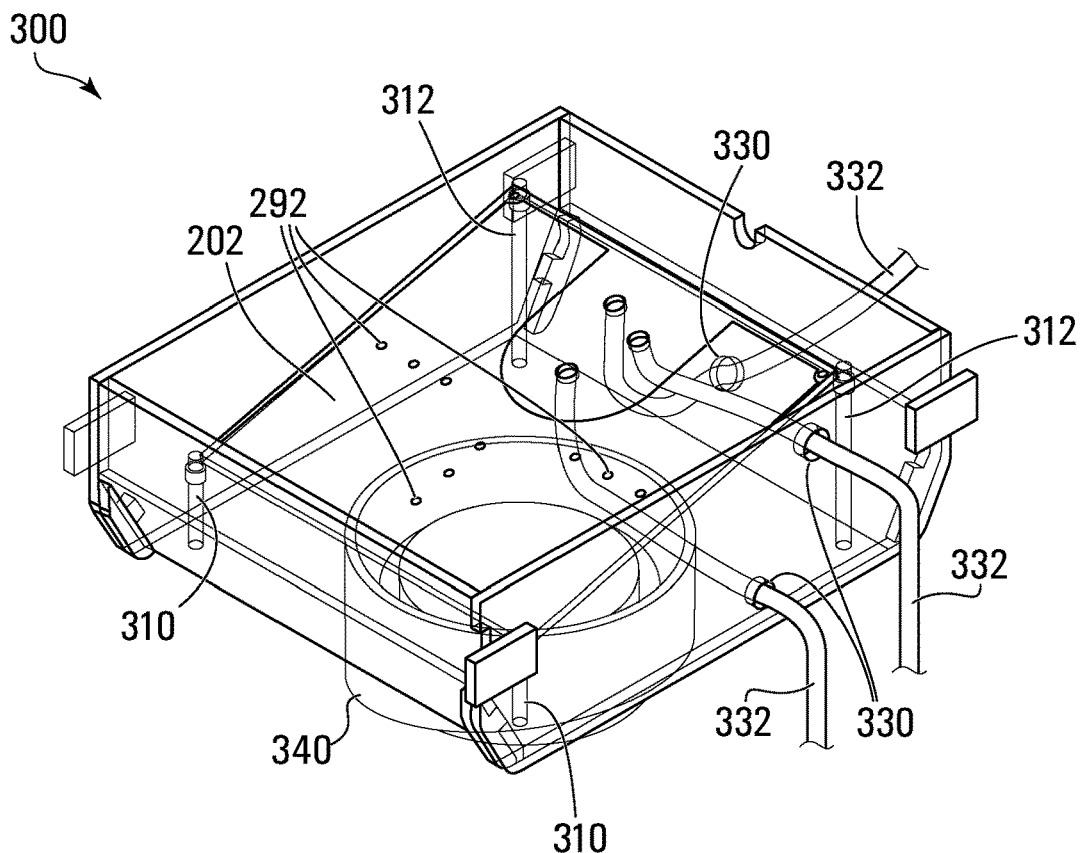
FIG. 3A is a perspective view of the support device of FIG. 2B mounted in a perfusion chamber in accordance with an example embodiment.
Figure 3B:
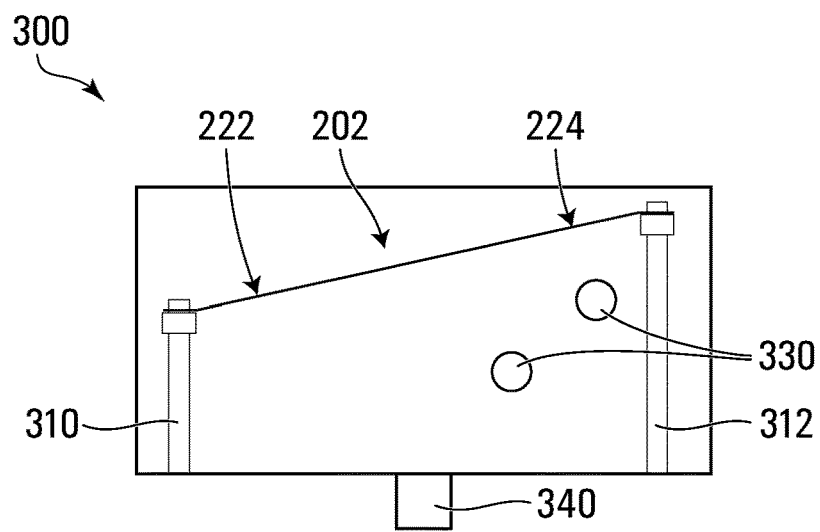
FIG. 3B is a right side view of the chamber of FIG. 3A.

In one embodiment, sheet 202 may include mounting holes 290, one placed at each corner thereof, for mounting sheet 202 in an organ perfusion chamber 300 (FIGS. 3A-3B).

In one embodiment, sheet 202 may be shaped or formed by a molding process. An example mold 500 (FIGS. 2F-2I) for forming a sheet 202 having two mechanical couplers 262 and a magnetic coupler 252 is shown. Mold 500 has cavities 512, 516 surrounded by side walls 510 shaped for forming sheet 202. Cavity 512 is for forming rigid portion 224 and cavity 516 is for forming soft portion 222. Notably, cavity 512 is deeper than cavity 516 for forming a sheet 202 having a rigid portion 224 that is thicker than soft portion 222. Reinforcing frame 280 may be positioned inside cavity 512 for encapsulation with rigid portion 224.

Figure 2H:
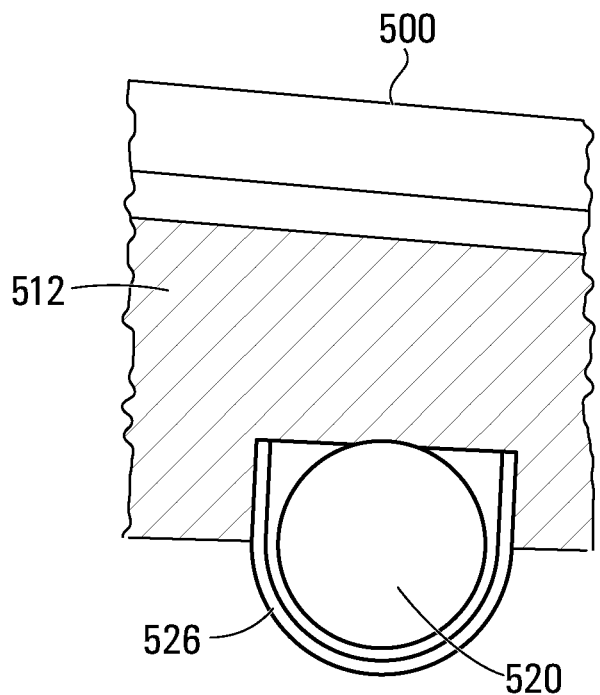
FIG. 2H is a partial bottom, front side perspective view of the example mold of FIG. 2F.
Figure 2I:
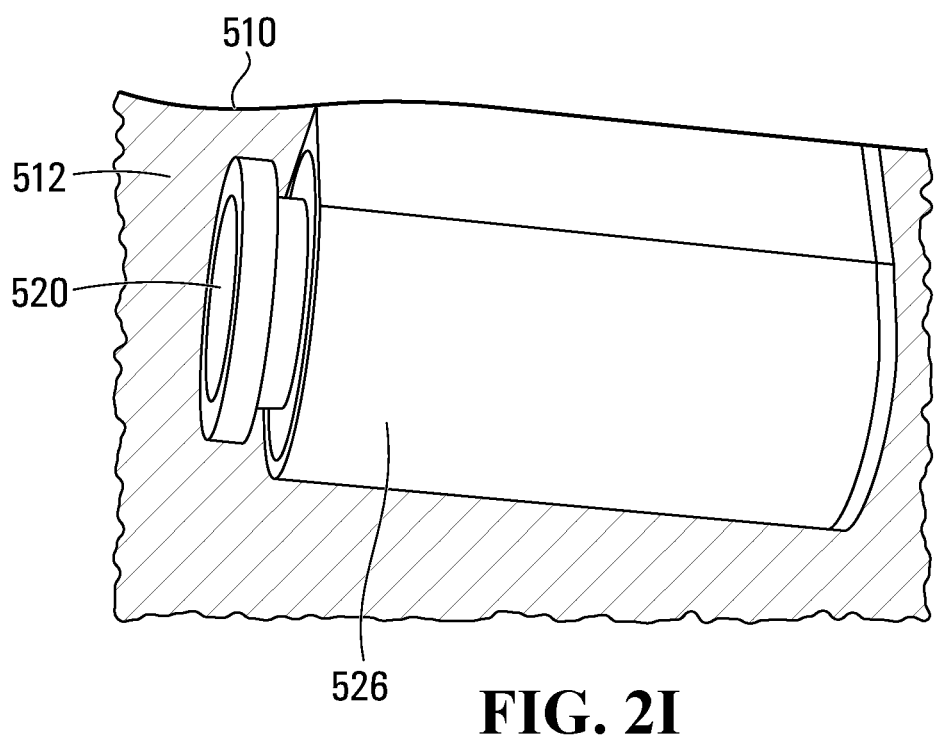
FIG. 2I is a partial bottom, side perspective view of the example mold of FIG. 2F.

An additional cavity 522 may be provided for forming magnetic coupler 262. An elbow-shaped core 520 may be positioned inside cavity 522 to form a conduit 966. Core 520 may extend from an upper side of mold 500 to a lower side of mold 500 (FIGS. 2H-2I). On the lower side of mold 500, core 520 is surrounded by walls 526, used to form elbow 968. Magnetic or ferromagnetic materials (e.g. iron dust) may be placed inside cavity 522 for encapsulation with magnetic coupler 262.

An additional cavity 506 may be provided for forming each mechanical coupler 262. Core 504 may be positioned inside cavity 506 to form channel 864. Core 504 may extend below cavity 512 to form layer 802 of sheet 202. Core 504 may also be used to form opening 804 in channel 864 (FIG. 8A). A cannula 824 having flanged base 826 may be placed inside each cavity 506 for encapsulation with mechanical coupler 262.

Mold 500 may include protrusions 514 positioned at the corners of cavity 512 to form mounting holes 290.

One or more liquefied materials, such as different types of silicone rubbers having different stiffness properties, may be poured into the cavities of mold 500 to form elements of sheet 202. For example, a relatively soft silicone may be poured into cavity 516 to form soft portion 222 of sheet 202. Further, a relatively rigid silicone may be poured cavity 512 to form rigid portion 224 of sheet 202. Yet another, stiffer silicone may be poured into cavity 522 to form elbow 968. Accordingly, different materials may be poured into different cavities of mold 500 to achieve the desired characteristics of sheet 202. The different materials may bond to one another without substantially mixing with one another.

Each material may cure and harden at a specific temperature. For example, the Ecoflex® cured silicone rubber that may be used for soft portion 222 of sheet 202 cures after being placed at a temperature of 23 Celsius for 45 minutes, and the Dragon Skin® FX-Pro silicone rubber that may be used for rigid portion 224 of sheet 202 cures after being placed at a temperature of 23 Celsius for 45 minutes. Once the materials cure, the mold 500 may be removed.

Reference is now made to FIGS. 3A-3B, which illustrate an organ perfusion chamber 300 having sheet 202 mounted inside the chamber 300. Chamber 300 has a plurality of ports 330 for connecting a plurality of fluid conduits 332 to fluid system 228 (FIG. 2A). Fluid conduits may also be connected to connectors 250 of sheet and therethrough to the organ supported on sheet 202.

Sheet 202 is mounted inside chamber 300 in a generally extended position to provide a platform of sufficient size for the organ to rest thereon. As depicted, four mounting posts 310, 312 are provided and positioned in chamber 300, relatively positioned to match the relative positions of mounting holes 290 of sheet 202, for mounting sheet 202. Sheet 202 may be coupled and affixed to mounting posts 310 in any suitable manner.

In one embodiment, as illustrated in FIG. 3B, two short mounting posts 310 are provided and configured for mounting the lower edge of soft portion 222 at a lower height and two tall mounting posts 312 are provided and configured for mounting the upper edge of rigid portion 224 of sheet 202 at a higher height that is higher than the lower height, such that sheet 202 is inclined when mounted and soft portion 222 is lower in height than rigid portion 224.

In one embodiment, the incline of sheet 202, once mounted in chamber 300, may range from 15 to 20 degrees relative to the horizontal plane. This configuration allows the aorta of the heart to be positioned at an elevated level relative to the pulmonary veins of the heart to aid in de-airing of the heart during perfusion.

Optionally, chamber 300 may include a drainage conduit 340 to allow for fluids that collect in chamber 300, such as perfusate, to flow to fluid system 228.

Figure 4A:
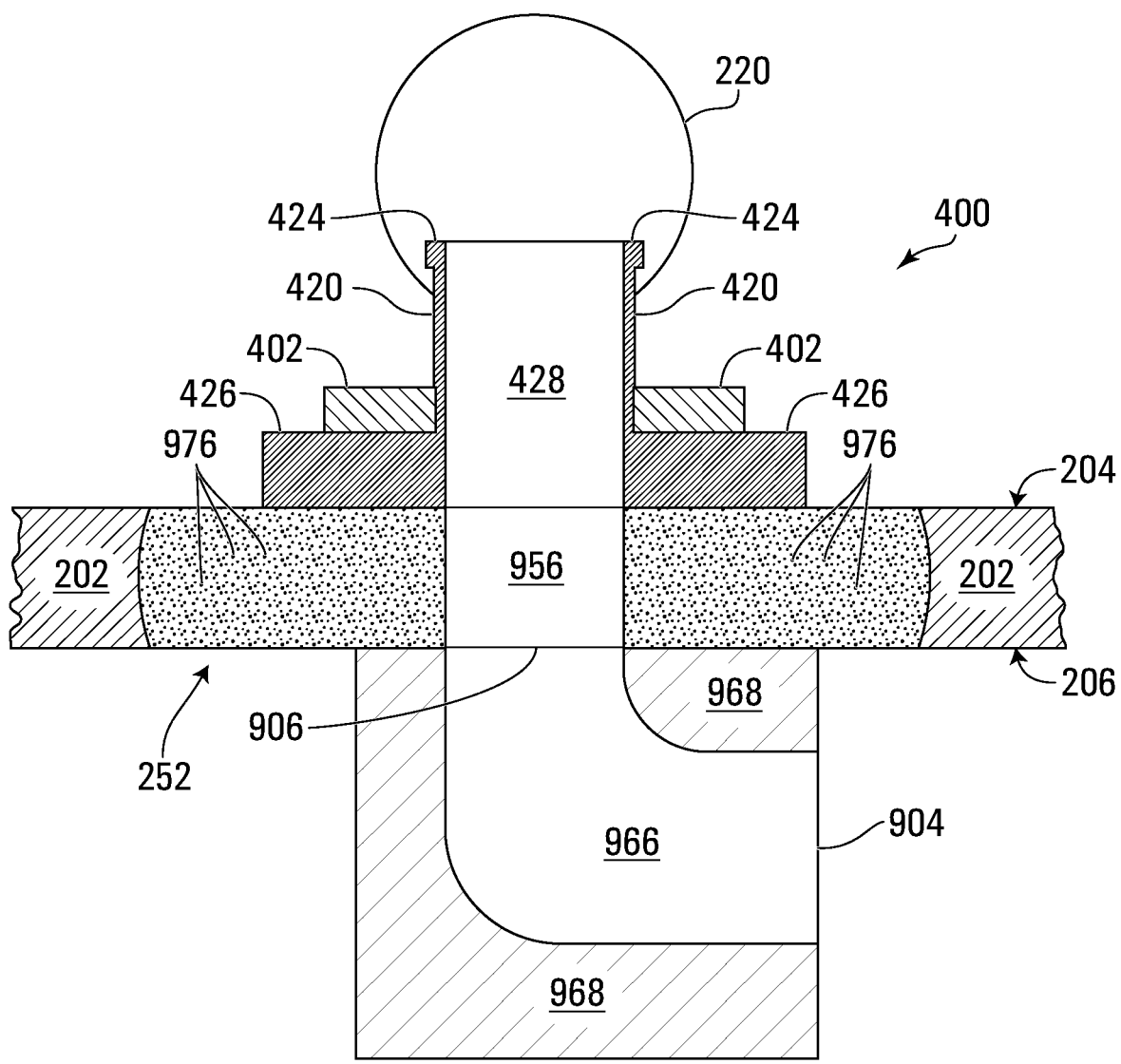
FIG. 4A is a cross-section view of a magnetic coupler of the support device of FIG. 2B coupled to an external magnetic connector in accordance with an example embodiment.
Figure 4B:
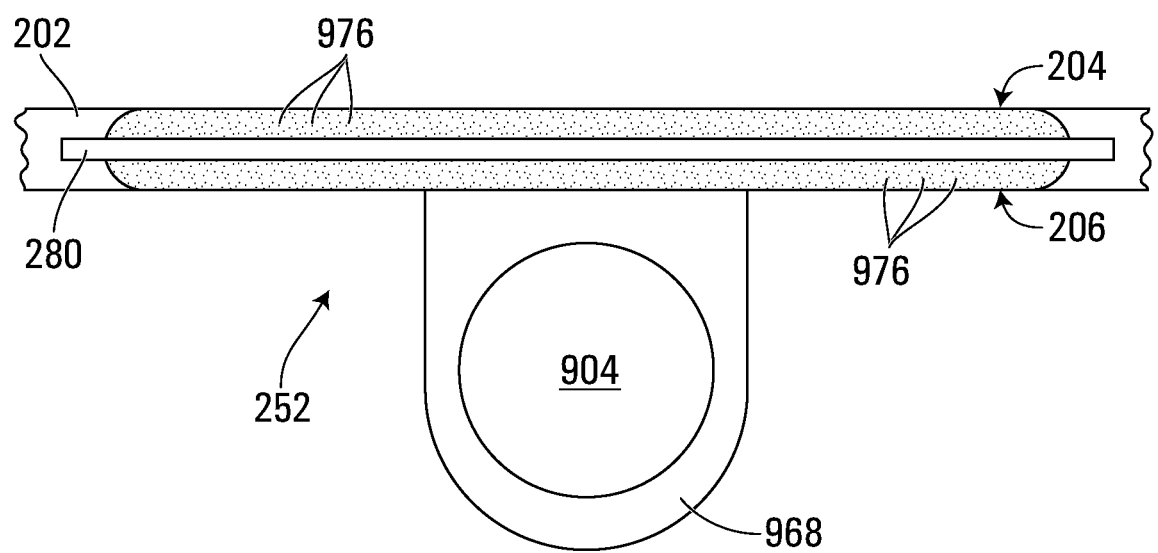
FIG. 4B is a side view of the magnetic coupler shown in FIG. 4A.
Figure 4C:
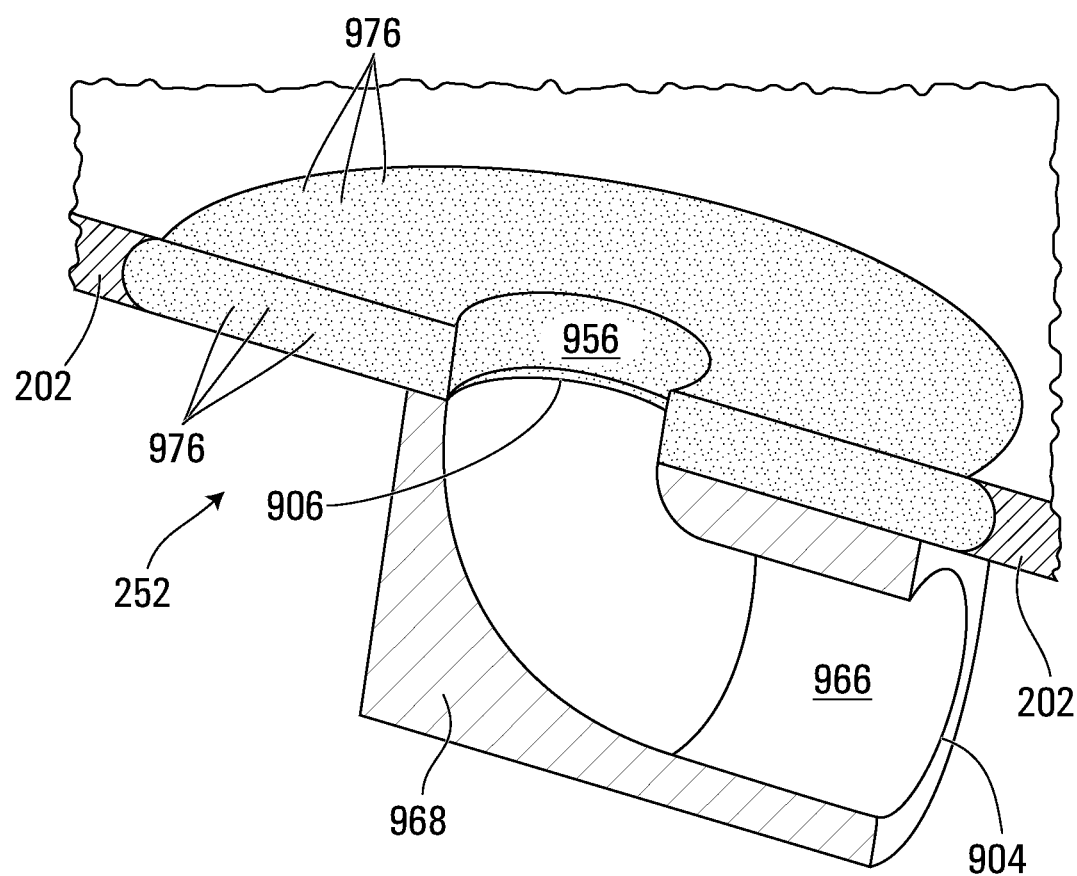
FIG. 4C is a perspective cut-out view of the magnetic coupler of FIG. 4B.

Reference is now made to FIG. 4A, illustrating magnetic coupler 252 being coupled to magnetic connector 400, and FIGS. 4B-4C, illustrating magnetic coupler 252 in isolation.

Magnetic or ferromagnetic particulates 976, such as iron dust, are dispersed or distributed in areas surrounding opening 956 for magnetically coupling to an external magnetic connector, so as to establish quick connection and secure the connection between conduit 966 and a supported organ 220. The iron dust may be made of iron particles of very small sizes, such as in the range of 20-200 μm. The small size of the iron dust (or other particulates) allows rigid portion 224 to retain most of its flexibility and resilience. Further, small particulates may be more conveniently embedded than larger components during a molding process for forming the sheet 202. However, other magnetic or ferromagnetic particulates, including granulates, may be used in different embodiments.

Particulates 976 may be embedded within sheet 202. In one embodiment, particulates 976, such as iron dust, may be embedded in sheet 202 during molding of sheet 202. For example, iron dust may be added to a liquid silicone material in cavity 522 of mold 500. Once the liquid silicone material cures, the iron dust will be encapsulated within the silicone material, thereby embedding the iron dust within sheet 202.

The external magnetic connector 400 may be coupled to the supported organ 220 such as by suturing, as illustrated in FIG. 4A. Alternatively, organ 220 may be coupled to a cannula (not shown) which is inserted into conduit 428 of connector 400.

When magnetic coupler 252 is magnetically coupled with the external magnetic connector 400, opening 956 and conduit 428 in external magnetic connector 400 are aligned and in seal-tight connection to allow fluid communication between organ 220 and conduit 966, as illustrated in FIG. 4A.

Conduit 428 of external magnetic connector 400 is thus placed in fluid communication with conduit 966. Conduit 966 interfaces at a first end 906 with opening 956 of rigid portion 224, and interfaces at a second end with an opening 904 for fluid communication therethrough. Opening 904 can be connected to fluid conduit 332 and to fluid system 228, thereby placing organ 220 in fluid communication with fluid system 228.

Conduit 966 may be formed in an elbow 968 attached to lower side 206 of sheet 202. An upper side of elbow 968 and lower side 206 of sheet 202 may be molded together; particularly if both sheet 202 and elbow 968 are made of the same or similar materials such as silicones. Nonetheless, if sheet 202 and elbow 968 different materials, a section of the mold defining elbow 968 can be filled with a first material and a section of the mold defining sheet 202 can be filled with a second material. Alternatively, elbow 968 may be encapsulated or mechanically locked to sheet 202 during the molding process. Alternatively, elbow 968 may be attached to lower side 206 using a waterproof adhesive, for example, an adhesive suitable for bonding silicone.

Elbow 968 may be made of any suitable material, such as a silicone, polyurethane, PVC, other plastics, or metal material. Elbow 968 may be made of a rigid and stiff material to allow for a high rate of flow of pressurized fluids through conduit 966.

Figure 4D:
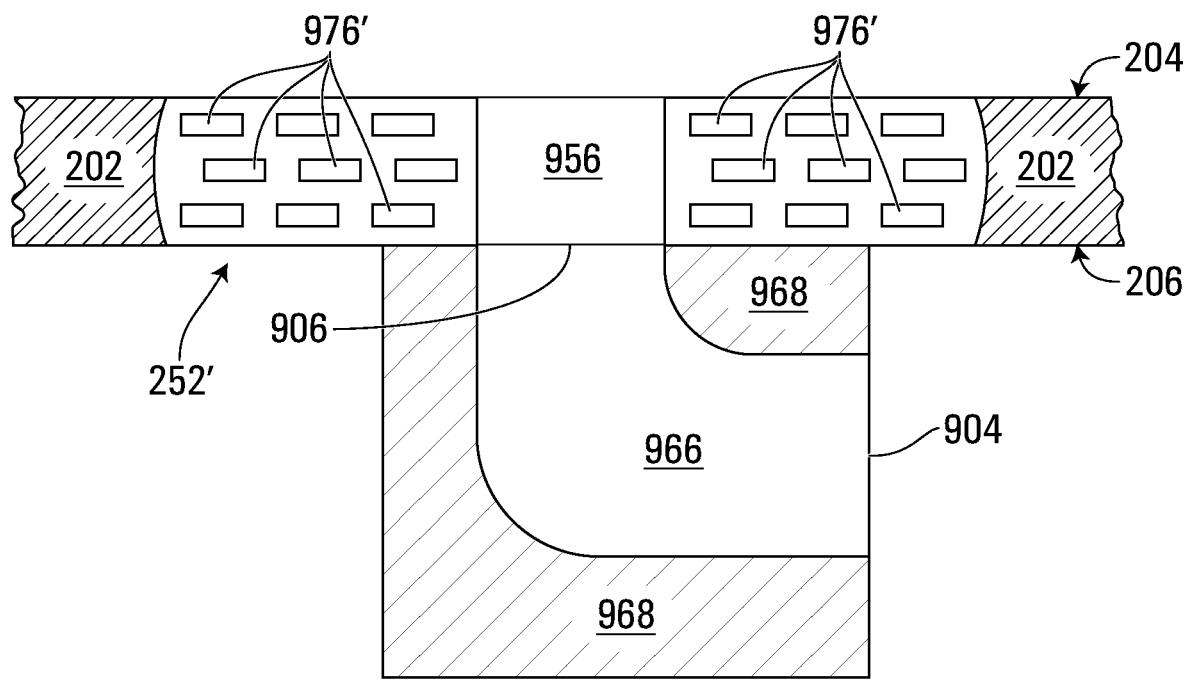
FIG. 4D is a cross-section view of an alternative embodiment of the magnetic coupler.
Figure 4E:
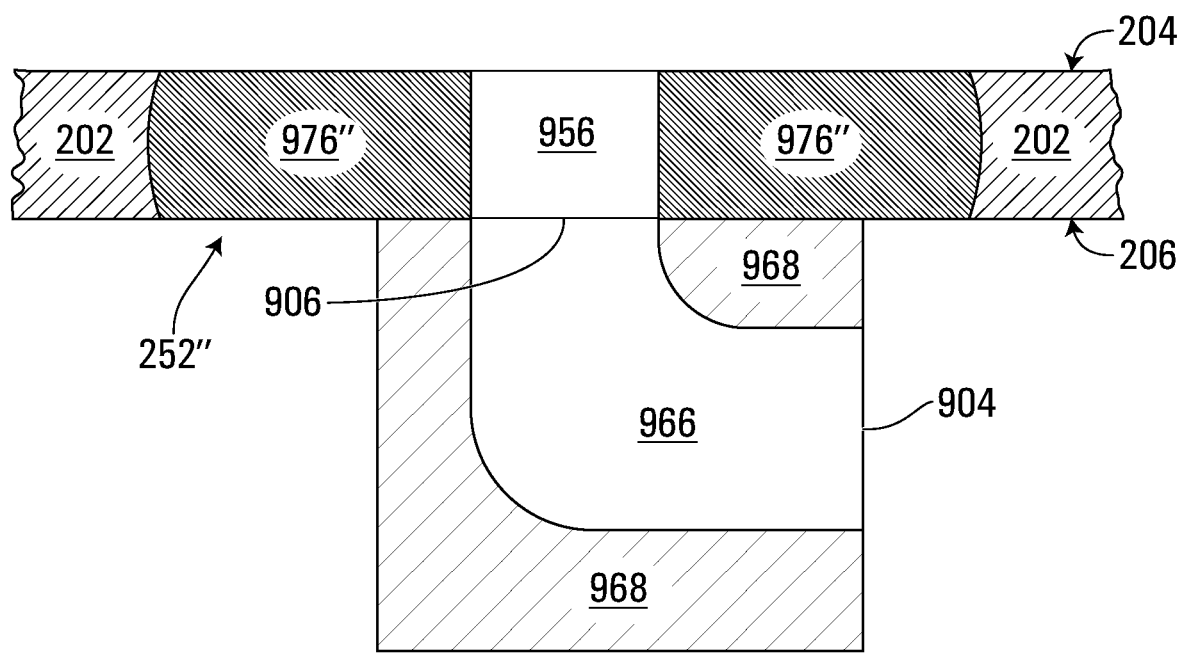
FIG. 4E is a cross-section view of another alternative embodiment of the magnetic coupler.
Figure 5A:
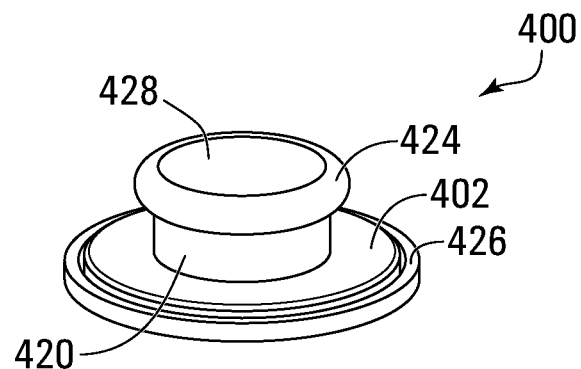
FIG. 5A is a perspective view of an external magnetic connector for use with the magnetic coupler of FIG. 4A.
Figure 5B:
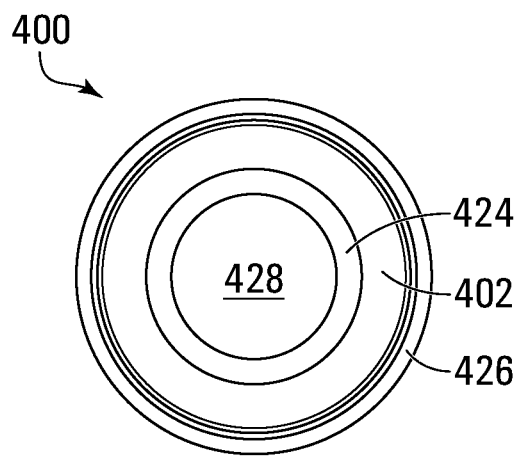
FIG. 5B is a top plan view of the external magnetic connector of FIG. 5A.
Figure 5C:
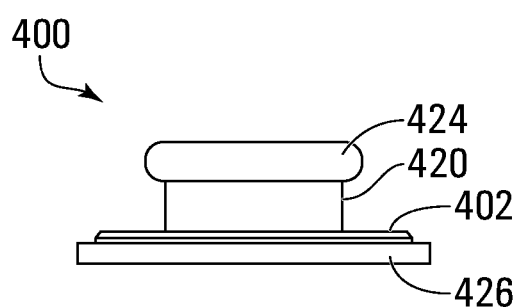
FIG. 5C is a side elevation view of the external magnetic connector of FIG. 5A.

In an alternative embodiment, shown in FIG. 4D, larger sized magnets or ferromagnetic pieces 976' may be embedded into rigid portion 224. The size of the magnets or ferromagnetic pieces may range from about 0.2 mm to a few centimeters. Further, in an alternative embodiment, shown in FIG. 4E, a single magnetic or ferromagnetic flange 976" may be embedded within rigid portion 224.

Pieces 976' or flange 976" may also be embedded within sheet 202. In one embodiment, pieces 976' or flange 976" may be embedded in sheet 202 during molding of sheet 202. For example, pieces 976' or flange 976" may be added to a liquid silicone material in cavity 522 of mold 500. Once the liquid silicone material cures, the pieces 976' or flange 976" will be encapsulated within the silicone material, thereby embedding the pieces 976' or flange 976" within sheet 202.

Reference is now made to FIGS. 5A-7C, showing example external magnetic connectors 400, 400', and 400" for use with magnetic coupler 252. Each of magnetic connectors 400, 400', and 400" may be configured and sized for coupling with magnetic coupler 252.

Each of the magnetic connectors 400, 400', and 400" has a cannula 420 having an upper rim 424 for coupling the cannula to an artery or vein of an organ (e.g. by suturing) and a lower rim 426 for coupling the cannula to a magnetic coupler 252. Upper and lower rims 424, 426 are connected to one another by a hollow tube defining a conduit 428 to allow for fluid communication between the rims.

A magnetic flange 402 is mounted on lower rim 426. Magnetic flange 402 has an inner diameter that is smaller than the outer diameter of cannula 420, to allow for flange 402 to be mounted on lower rim 426. Magnetic flange 402 may be mounted by passing the flange 402 through upper rim 424. Accordingly, upper rim 424 may be deformable to allow for flange 402 to pass through.

When magnetic connector 400 with magnetic flange 402 is brought close to magnetic coupler 252, magnetic flange 402 is magnetically attracted towards the particulates 976, and lower rim 426 will be biased to contact and pressed against magnetic coupler 252 around opening 956. That is, magnetic flange 402 applies a downward force pressing lower rim 426 against sheet 202, forming a fluid-tight seal between sheet 202 and magnetic connector 400. Conveniently, conduit 428 can be easily aligned with the opening 956 of sheet 202.

In some embodiments, a magnet may be embedded within lower rim 426 to replace the separate magnetic flange 402.

Figure 6A:
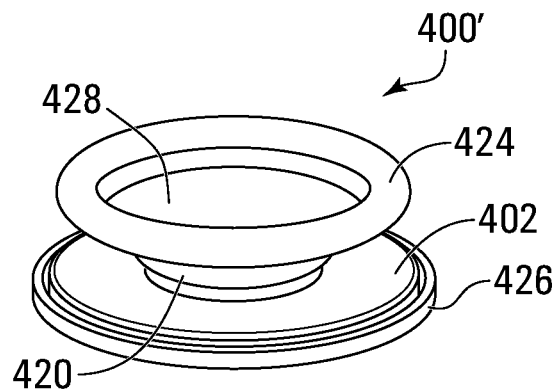
FIG. 6A is a perspective view of another external magnetic connector for use with the magnetic coupler of FIG. 4A.
Figure 6B:
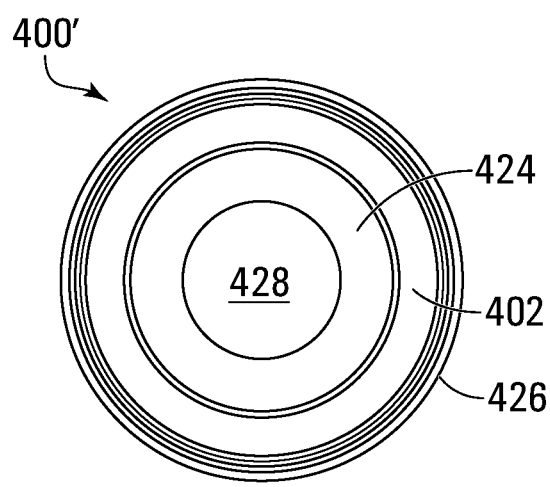
FIG. 6B is a top plan view of the external magnetic connector of FIG. 6A.
Figure 6C:
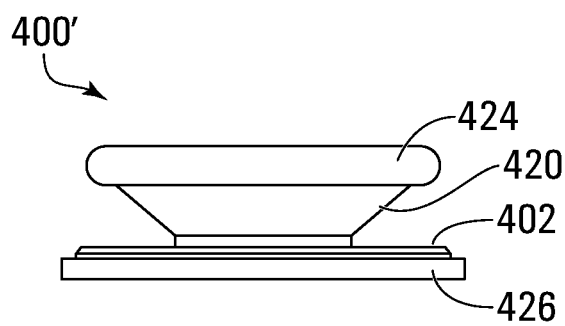
FIG. 6C is a side elevation view of the external magnetic connector of FIG. 6A.
Figure 7A:
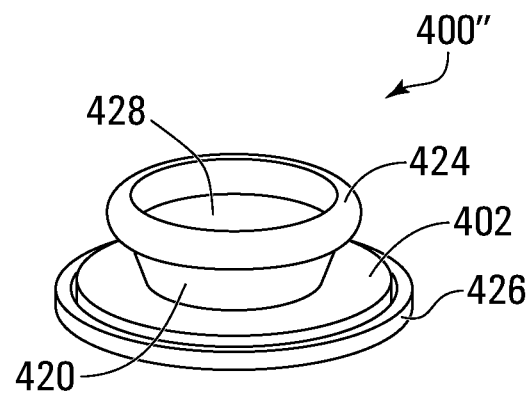
FIG. 7A is a perspective view of another external magnetic connector for use with the magnetic coupler of FIG. 4A.
Figure 7B:
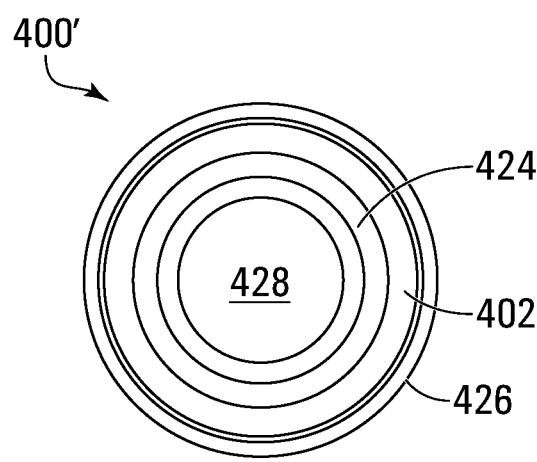
FIG. 7B is a top plan view of the external magnetic connector of FIG. 7A.
Figure 7C:
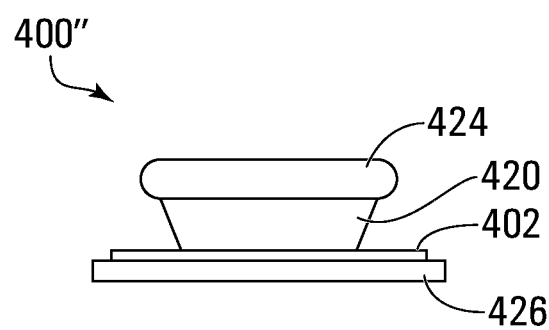
FIG. 7C is a side elevation view of the external magnetic connector of FIG. 7A.

Magnetic connectors 400, 400', and 400" are of similar design and construction, except that their upper and lower rims 424, 426 are sized differently to match the sizes of the particular tissue opening to which they are to be attached and the size of the particular opening in the sheet 202 with which they are to be aligned. Cannula 420 may be angled to accommodate an upper rim 424 that is wider than the lower portion of cannula 420, as illustrated in FIGS. 6C and 7C.

The upper rims 424 of the magnetic connectors 400, 400', and 400" are shown to have different outer diameters, selected to conform to the diameter of a selected artery or vein, and which may range from 8 mm to 35 mm. For example, magnetic connector 400 is configured for coupling to an atrium of a heart (i.e. the left or right atrium), and magnetic connector 400' is configured for coupling to an artery of a heart (i.e. the aorta or the pulmonary artery). Accordingly, upper rim 424 of magnetic connector 400' has a wider diameter than upper rim 424 of magnetic connector 400, as the arteries of heart are narrower in diameter than the atrial connections. In one embodiment, the outer diameter of upper rim 424 of connector 400' is approximately 35 mm, and the outer diameter of upper rim 424 of connector 400 may is approximately 22 mm.

Similarly, the lower rims 426 of the magnetic connectors 400, 400', and 400" are shown to have different outer diameters, and which may range from 20 mm to 40 mm. It will be understood that the diameter of a lower rim 426 may vary to match the diameter of magnetic coupler 252.

Similarly, the cannula 420 of the magnetic connectors 400, 400', and 400" are also shown have to have different outer diameters at the point of connection with lower rim 426, and which may range from 8 mm to 35 mm. It will be understood that the diameter of a cannula 420 may vary to match the diameter of an opening 956.

In one embodiment, the body of magnetic connectors 400, 400', and 400" is made of a rigid biocompatible plastic (such as nylon, polycarbonate, or other acrylic) to allow for fluid communication through conduit 428 thereof. Magnetic flange 402 may be made of a magnetic material providing sufficient downward force.

Figure 8B:
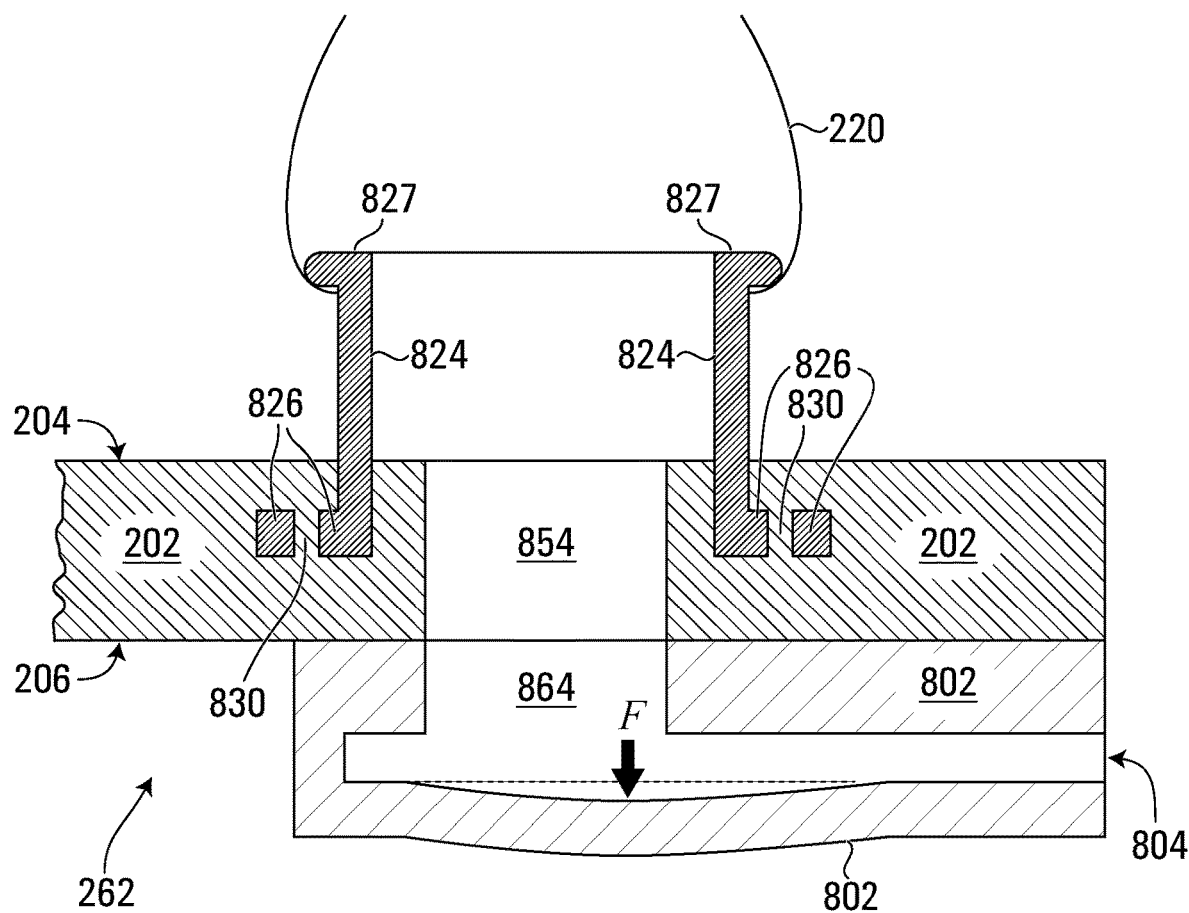
FIG. 8B is a cross-section view of the mechanical coupler of FIG. 8A in a distended position.
Figure 8C:
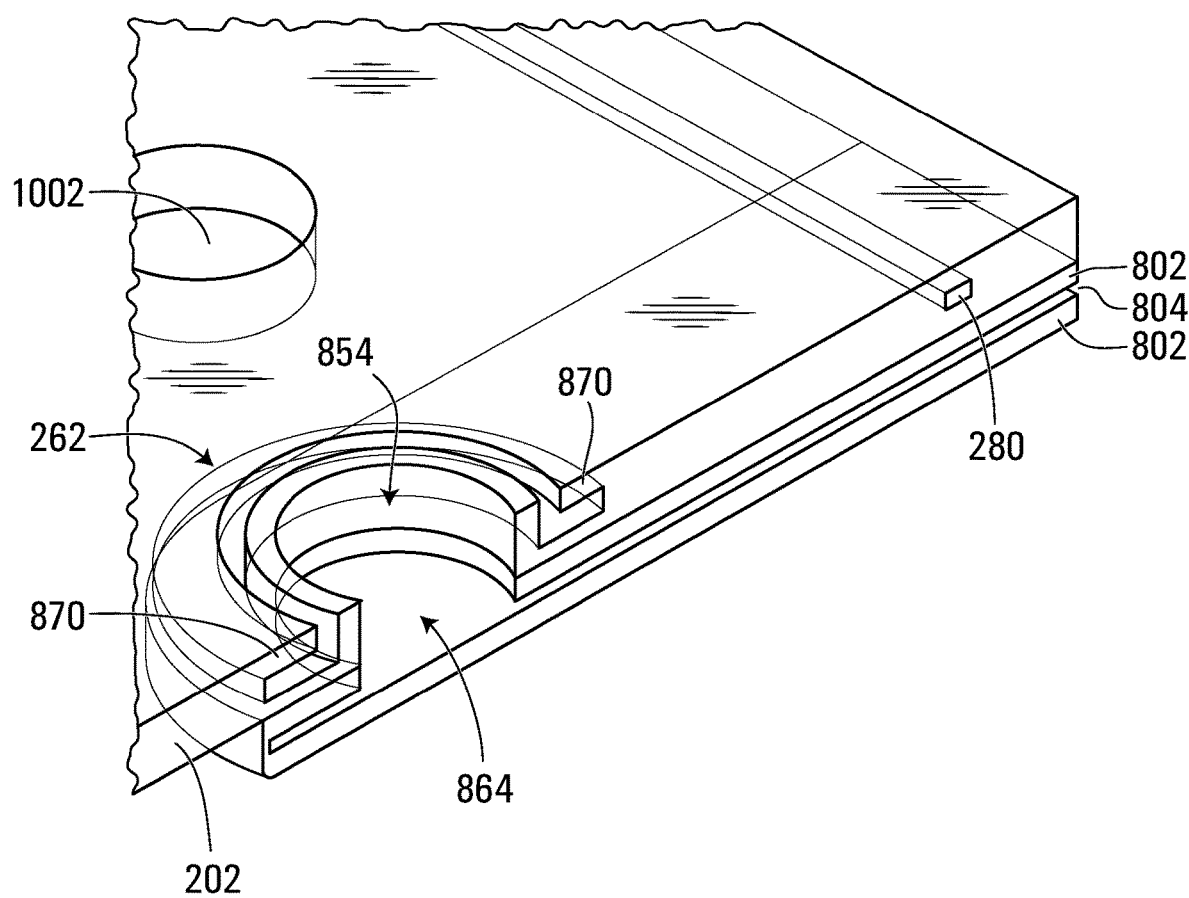
FIG. 8C is a perspective cross-section view of the mechanical coupler of FIG. 8A.

Reference is now made to FIGS. 8A-8B, illustrating mechanical coupler 262 having a cannula 824 attached thereto, and FIG. 8C, illustrating mechanical coupler 262 without cannula 824.

Mechanical coupler 262 may have attached thereto cannula 824. In some embodiments, as shown in FIGS. 8F-8G, cannula 824 has a flanged end 826. Flanged end 826 may be encapsulated into the material of sheet 202 during the molding process. To allow for the encapsulation of flanged end 826, in one embodiment, flanged end 826 includes ribs 828 extending outwardly to secure a circular rim 829 to flanged end 826. Ribs 828 and circular rim 829 define a plurality of voids 830. During the molding process, voids 830 may be filled with a liquefied material used to define rigid portion 224 of sheet 202. When the liquefied material cures, flanged end 826 becomes encapsulated in rigid portion 224 of sheet 202, thereby securing cannula 824 to mechanical coupler 262 and creating a fluid-tight seal.

Alternatively, as illustrated in FIG. 8C, mechanical coupler 262 may include a flexible lip 870 in upper side 204 of sheet 202 around opening 854 for securing cannula 824 into sheet 202. To secure cannula 824 in sheet 202, flexible lip 870 extends partially over a groove in sheet 202. Cannula 824 may be inserted into sheet 202 by flexing flexible lip 870 upwards and inserting lower rim 826 of cannula 824 into the groove of sheet 202. Flexible lip 870 then secures cannula 824 into the groove by biasing down against the lower rim of cannula 824 as it flexes to its original position, thereby creating a fluid-tight seal.

To connect opening 854 to an artery or vein of an organ 220, organ 220 is connected to an upper rim 827 of cannula 824 (e.g. upper rim 827 may be sutured onto the artery or vein of organ 820), as shown in FIG. 8A.

Opening 854 of sheet 202 is in fluid communication with fluid channel 864. Fluid channel 864 extends between an upper side and a lower side of a layer 802 attached to the lower side 206 of sheet 202. In some embodiments, layer 802 and sheet 202 may be molded together. Alternatively, layer 802 may be attached to lower side 206 of sheet 202 using a waterproof adhesive, for example, an adhesive made for bonding silicone.

Fluid channel 864 interfaces at one end with opening 854 and interfaces at the second end with an opening 804 on a side of sheet 202 for fluid communication therethrough. Opening 804 can be connected to a fluid conduit 332 and to fluid system 228, thereby placing organ 220 in fluid communication with fluid system 228. Fluid may flow through opening 854 on upper side 204 of sheet 202 to opening 804 through fluid channel 864, and then through fluid conduits 332. Similarly, fluid may flow in the opposite direction.

As will be appreciated, the flow of fluid through fluid channel 864 is expected to apply a force, F, against the walls of layer 802, which may cause the channel to distend, as shown in FIG. 8B. Notably, in FIG. 8B, the undistended walls of channel 864 are shown in phantom to better illustrate this effect.

Further, the degree of distention of fluid channel 864 will depend on the rate of flow of the fluid, as well as the resistance of the material used to define the channel and the thickness of the material.

Further, fluid channel 864 may have a wall thickness chosen in dependence on the expected rate of flow of the fluid within fluid channel 864 and the maximum allowable pressure on the wall of fluid channel 864. For example, the wall thickness of fluid channel 864 may be chosen in accordance with Barlow's formula, which defines the relationship between the internal pressure caused by a fluid in a conduit ('P'), the wall thickness the conduit ('t'), the maximum allowable stress on the material—which may correspond to the stiffness of the material—('S'), and the outside diameter of the conduit ('D') as $P=2St/D$. Accordingly, a rigid material having a thin wall may behave similarly to a soft material having a thick wall.

The material used to form channel 864 may also be chosen depending on the intended use of the channel—i.e. based on which artery or vein of a particular organ the channel may be coupled to, as the internal pressure created by the fluid may vary in each artery and vein of an organ.

In one embodiment, channel 864 is configured for receiving perfusate from the pulmonary artery of a heart. Inside the human body, the pulmonary artery carries deoxygenated blood from the right ventricle of the heart to the lungs through the very-low resistance, high capacitance blood vessels of the pulmonary vasculature. Accordingly, it may be advantageous to mimic the very-low resistance of the pulmonary vasculature during perfusion of the heart. Channel 864 may thus be advantageously made of a very soft material (e.g. with a Shore value of 00-30, such as the Ecoflex® cured rubber, with a wall thickness of 1 mm) to replicate the very-low resistance of the pulmonary vasculature.

Similarly, in another embodiment, channel 864 is configured for receiving perfusate from the aorta of a heart. Inside the human body, the pulmonary artery carries oxygenated blood from the left ventricle of the heart to the entire body through the blood systemic vasculature. The systemic vasculature provides a high resistance against the flow of the blood. Accordingly, it may be advantageous to mimic the high resistance of the systemic vasculature during perfusion of the heart. Channel 864 may thus be advantageously made of a hard material (e.g. a silicone with a Shore value of 2A, such as Dragon Skin® FX-Pro, with a wall thickness of 3 mm) to replicate the high resistance of the systemic vasculature. This may allow the channel to distend in a manner that resembles the "Windkessel" effect that occurs in the aorta inside the body.

In yet another embodiment, channel 864 is configured for providing perfusate to an atrium of the heart. In this case, a very low resistance pathway leading into the atrium is preferable, as the low resistance allows the pump pumping perfusate into the atrium to operate more efficiently. Accordingly, it may be advantageous to form channel 864 into a tube of a similar diameter as a fluid conduit 332 coupled to channel 864.

Figure 8D:
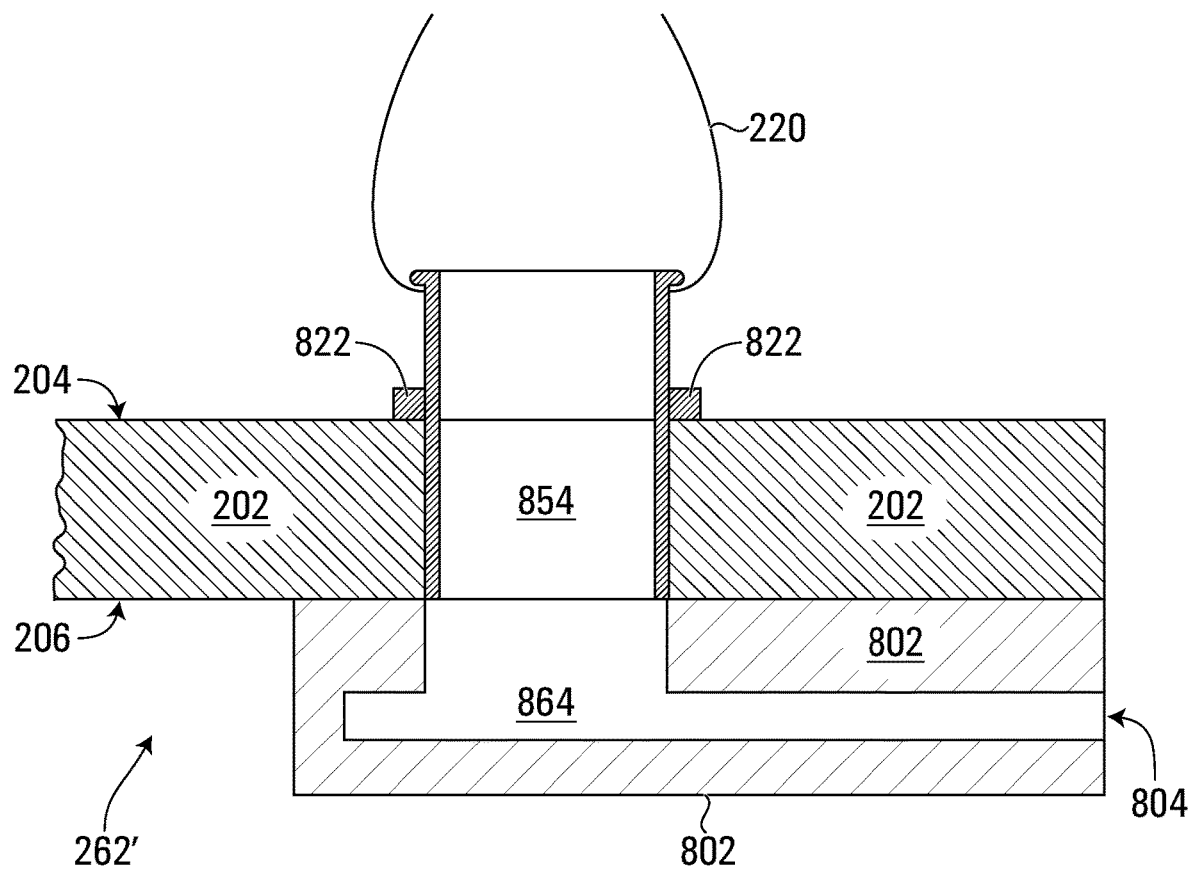
FIG. 8D is a cross-section view of a variant of the mechanical coupler in accordance with an example embodiment.
Figure 8E:
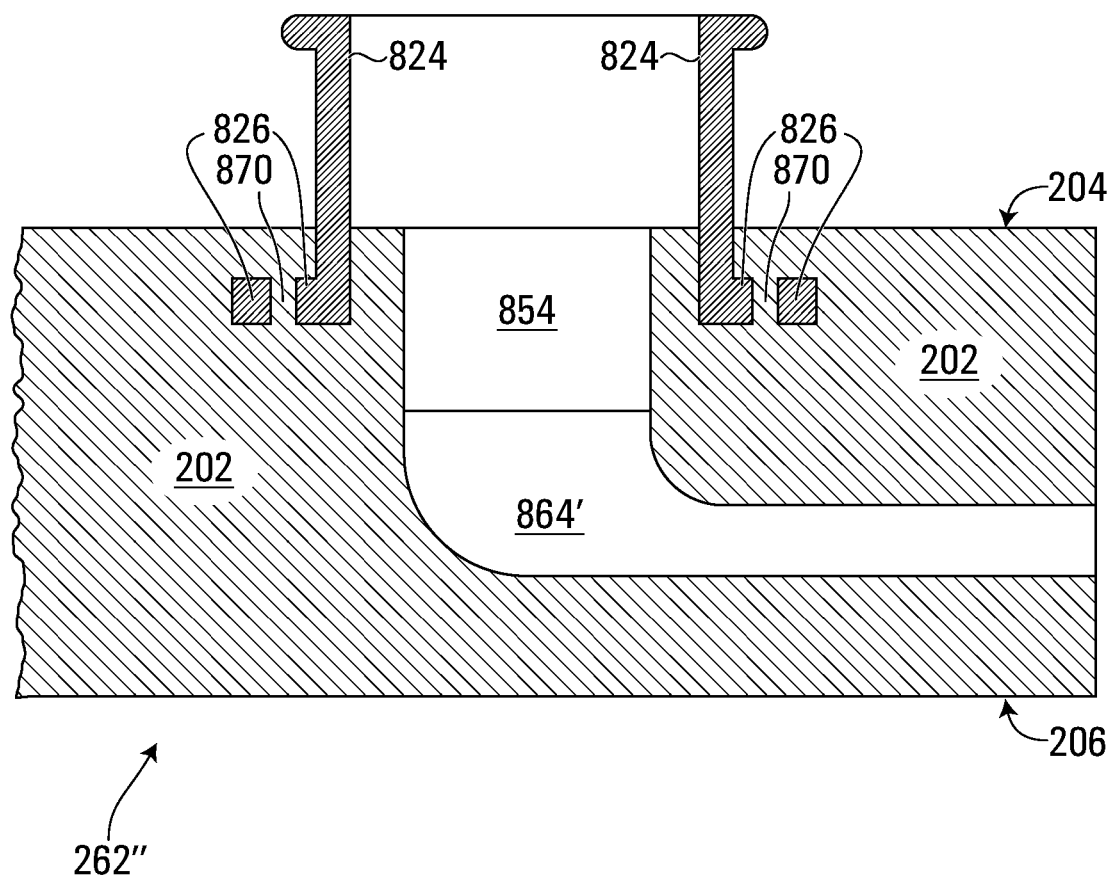
FIG. 8E is a cross-section view of a second variant of the mechanical coupler in accordance with an example embodiment.
Figure 8F:
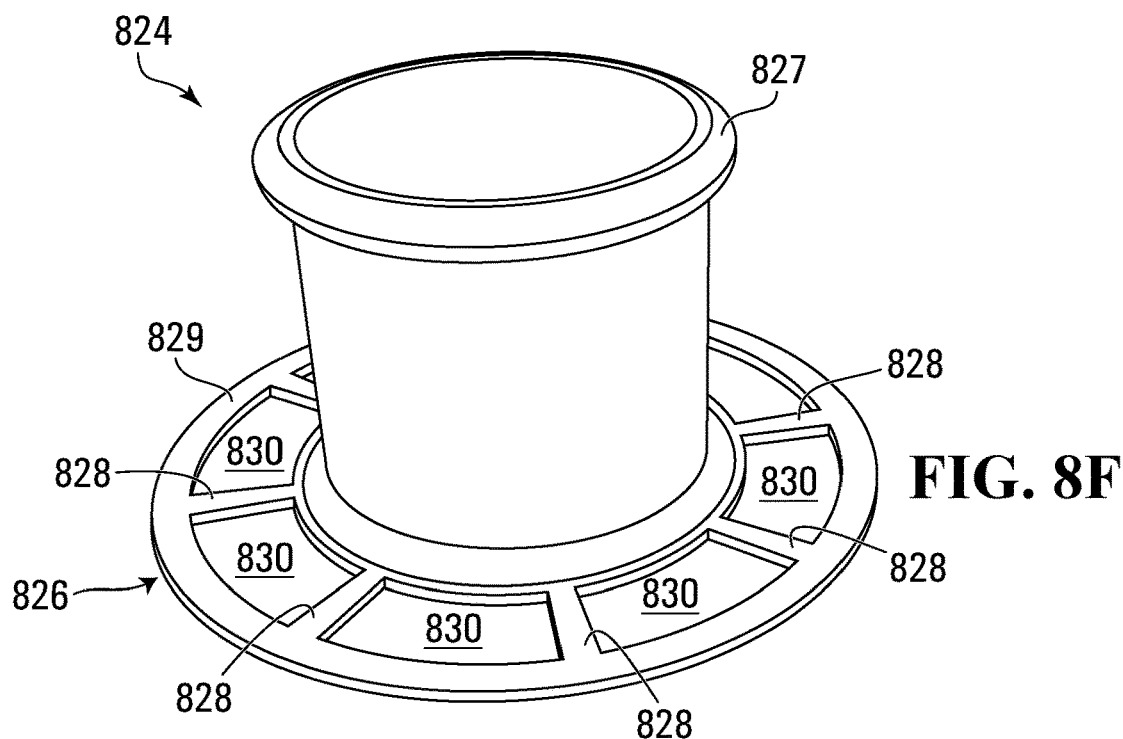
FIG. 8F is a perspective view of a cannula for use with the mechanical coupler of FIG. 8A.
Figure 8G:
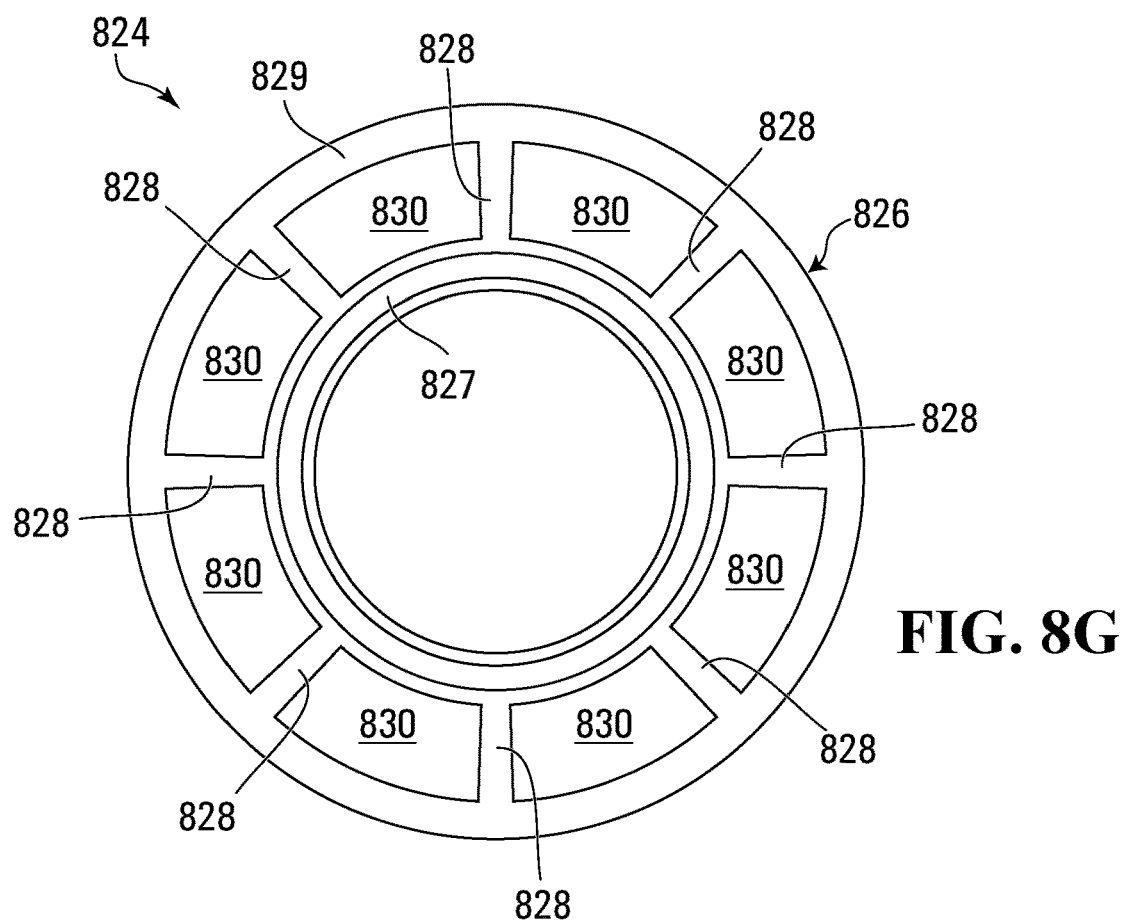
FIG. 8G is a top view of the cannula of FIG. 8F.

Reference is now made to FIG. 8D, illustrating an alternative embodiment of mechanical coupler 262' being coupled to cannula 822. Notably, cannula 822 is removably attached to mechanical coupler 262'. Cannula 822 may be inserted into and may pass through opening 854 to allow for fluid to flow to or from organ 220 through channel 864. Cannula 822 may have an outer diameter that closely matches the inner diameter of opening 854 such that cannula 822 and sheet 202 frictionally and sealing engage one another to secure the connection and prevents fluid leakage through any gap between cannula 822 and sheet 202 at opening 854.

Further, it will be appreciated that mechanical coupler 262' may include a magnetic or ferromagnetic material (not shown) embedded in sheet 202 around opening 854 such that when a magnetic material is also embedded in or otherwise provided on cannula 822, cannula 822 may be magnetically coupled and attached to sheet 202 around opening 854. In such a case, the magnetic portion around opening 854 can be considered a magnetic coupler instead of a mechanical coupler.

Reference is now made to FIG. 8E, illustrating an alternative embodiment of mechanical coupler 262" having a fluid channel 864' embedded within rigid portion 224 of sheet 202, extending between upper side 204 and lower side 206 of sheet 202.

Figure 9:
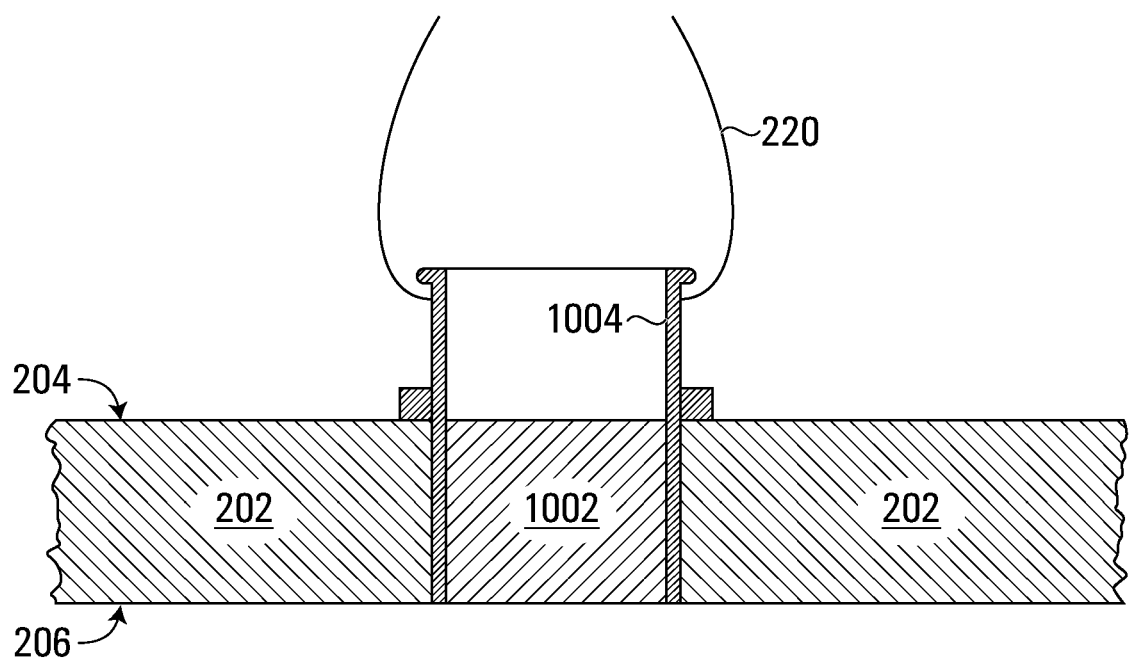
FIG. 9 is a cross-section view of a throughhole of the support device of FIG. 2B during use in accordance with an example embodiment.

Reference is now made to FIG. 9, illustrating the use of throughhole 1002. As depicted, a fluid tubing 1004 coupled to organ 220 is inserted in, and passes through the throughhole 1002. Throughhole 1002 extends from upper side 204 to lower side 206 of sheet 202 and is configured and sized to allow the fluid tubing 1004 (e.g. a cannula) attached to organ 202 to pass therethrough. A cannula or other rigid plastic tube can be received in throughhole 1002 and connected to fluid conduit 332 and to fluid system 228, thereby placing organ 220 in fluid communication with fluid system 228. The size of the throughhole 1002 may be marginally larger than the outer size of the tubing 1004.

Figure 10A:
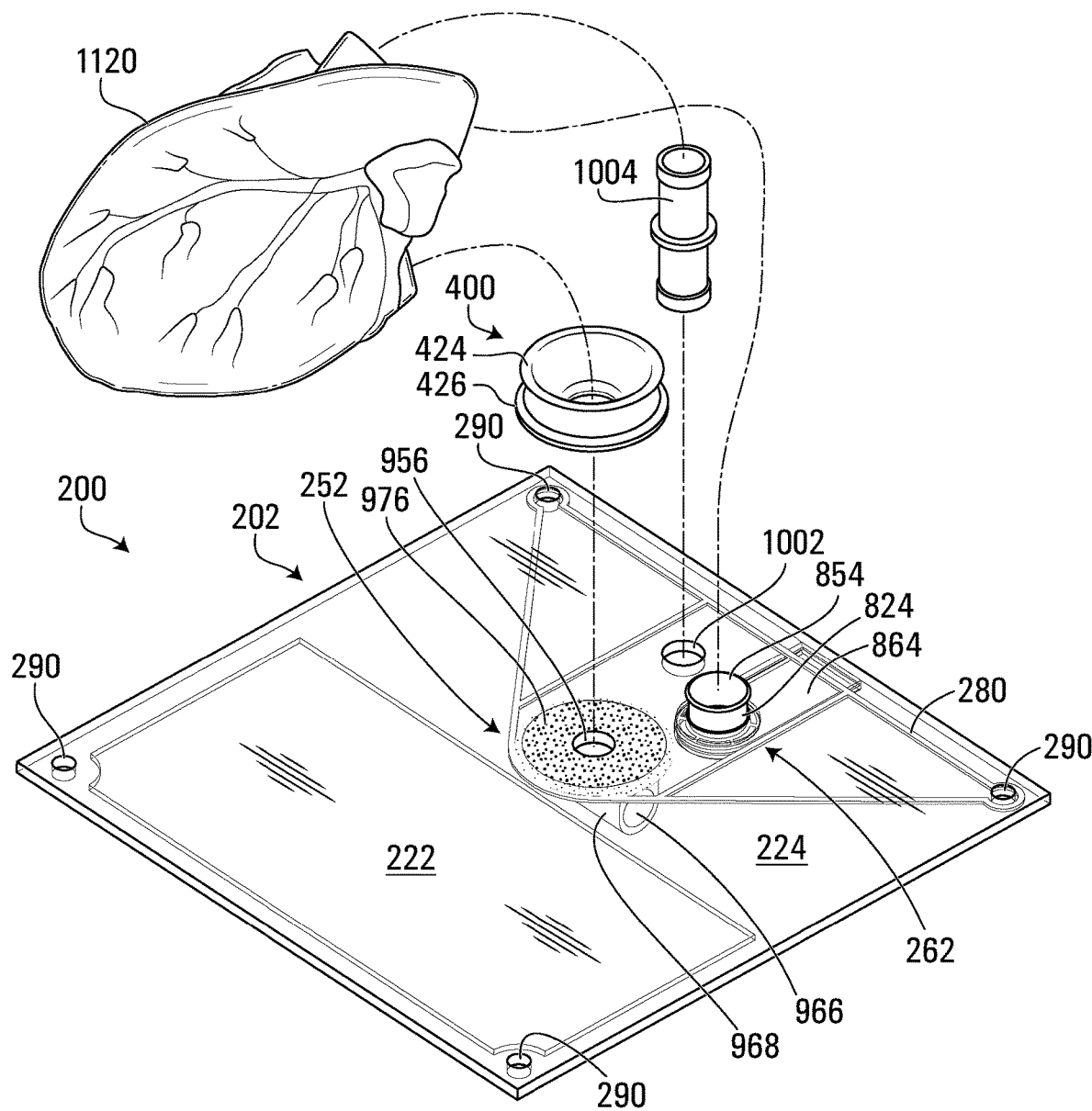
FIG. 10A is a perspective view of the support device of FIG. 2B during use in accordance with an example embodiment.
Figure 10B:
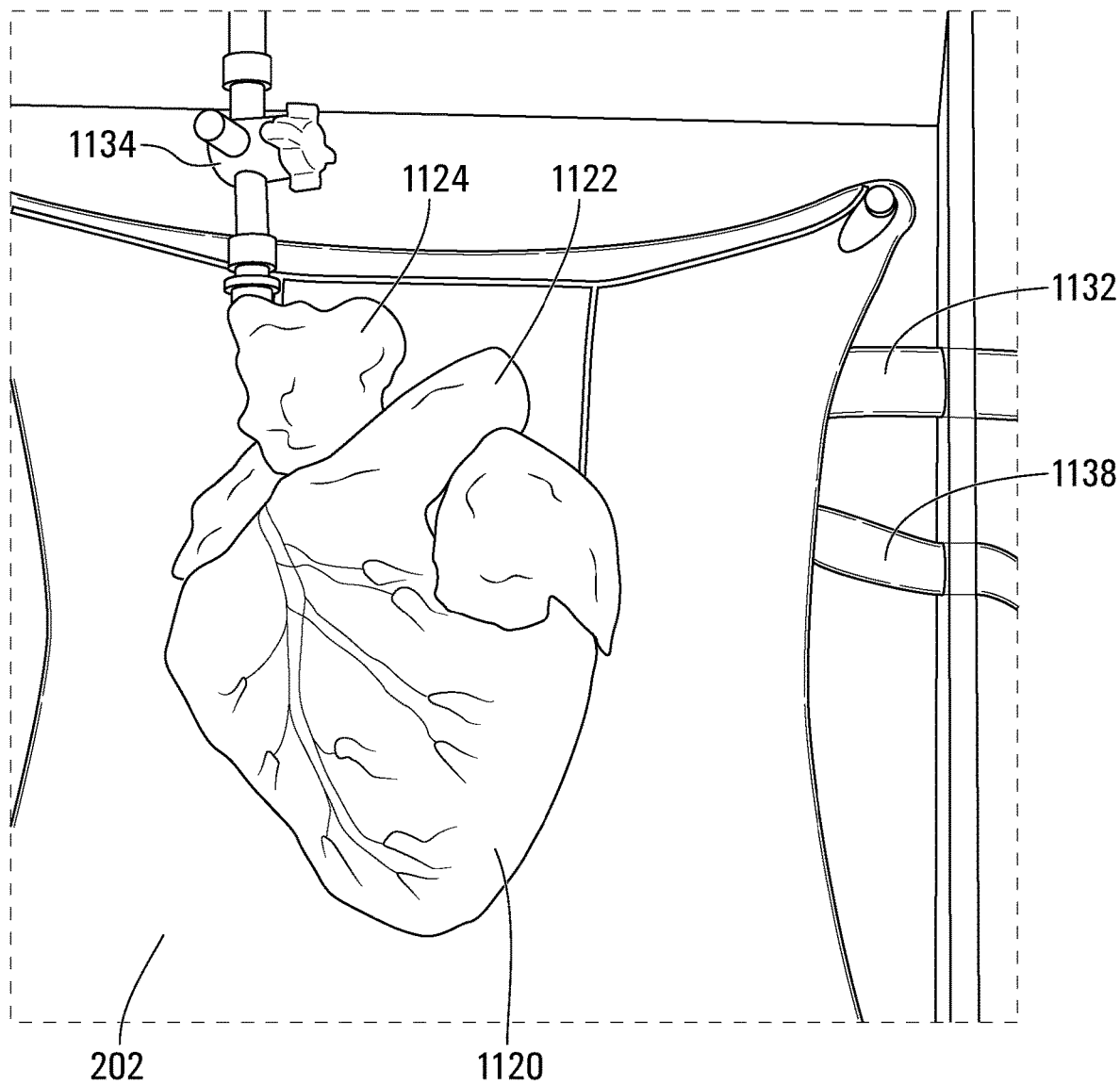
FIG. 10B is a top view of the support device of FIG. 2B during use in accordance with an example embodiment.
Figure 10C:
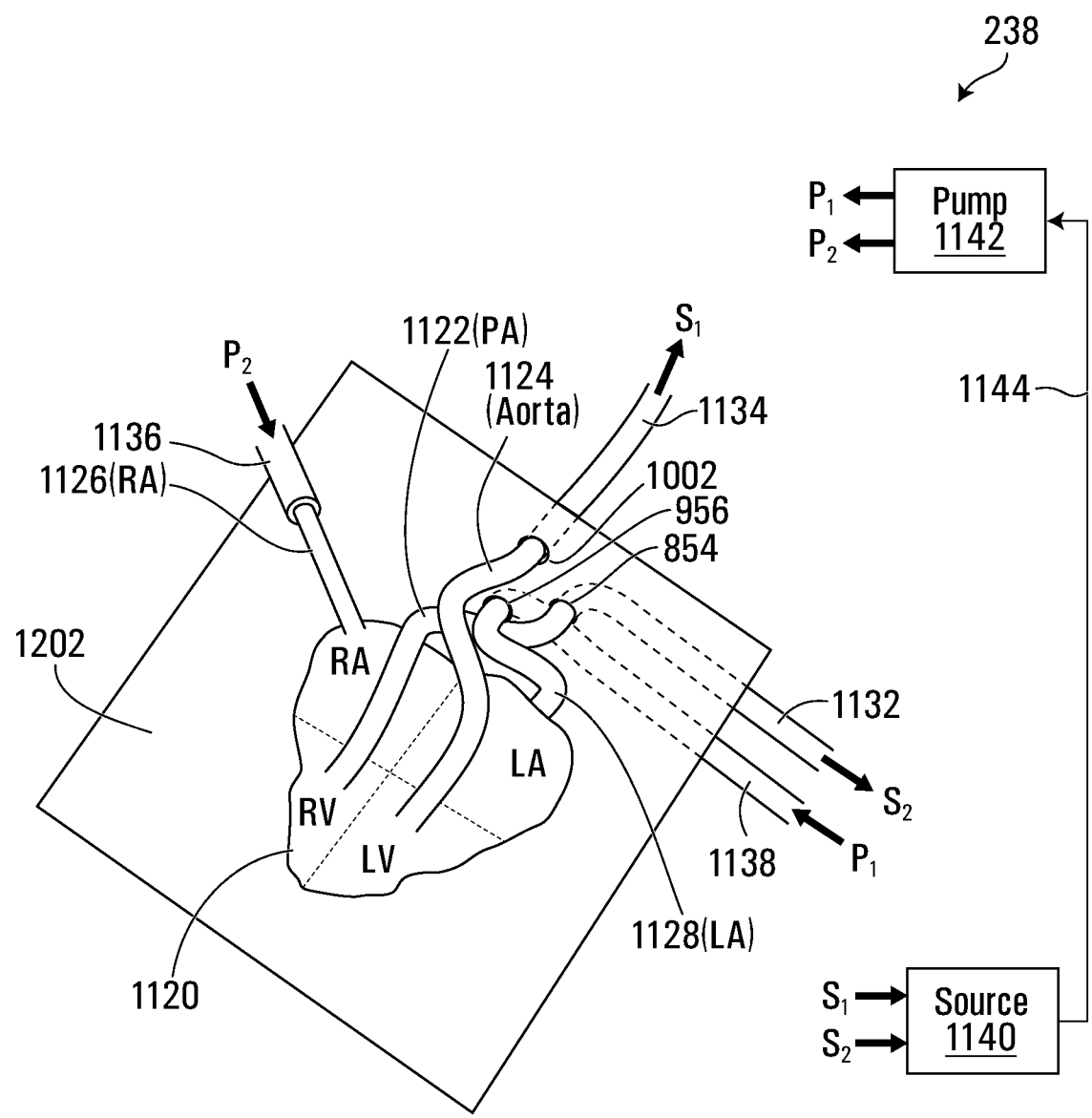
FIG. 10C is a block diagram illustrating schematically the support device of FIG. 2B coupled to an organ and a fluid system in accordance with an example embodiment.

In operation, an excised heart 1120 may be supported and connected using sheet 202 as illustrated in FIGS. 10A-10D. Sheet 202 may be mounted on mounting posts 310, 312 of chamber 300 (not shown in FIG. 10A, but see FIG. 10D; also see FIGS. 3A-3B) during use. The heart 1120 may be connected to a fluid system 228 through sheet 202 as illustrated in FIG. 10C. A sample and simplified fluid system 228 is partially shown in FIG. 10C, which includes a pump 1142 and a fluid source 1140. However, it should be understood that fluid system 228 may also include or employ additional components such as a heat exchanger, an oxygenator, and various sensors and valves, or the like.

Cannula 1004 is connected at one end, for example, by suturing, to aorta 1124 of heart 1120. Cannula 1004 passes through throughhole 1002. Cannula 1004 is also connected at a second end to fluid conduit 1134, which is in fluid communication with fluid source 1140 (through S1), thereby allowing fluid communication between aorta 1124 and fluid source 1140.

Mechanical coupler 262 has attached thereto cannula 824. Cannula 824 may also be sutured onto pulmonary artery 1122 of heart 1120. Pulmonary artery 1122 may thus be in fluid communication with fluid channel 864 (not shown but see FIGS. 8A-8C). Opening 804 (not shown) of fluid channel 864 is in fluid communication with fluid source 1140 of fluid system 228 via fluid conduit 1132 (through S2).

Magnetic coupler 252 is coupled to magnetic connector 400, which is in turn attached at upper rim 424, for example, by suturing, to pulmonary veins 1128 of heart 1120. Conduit 966 is in fluid communication with pump 1142 of fluid system 228 via fluid conduit 1138 (through P1). Conduit 1144 connects pump 1142 and fluid source 1140. Thus, pump 1142 causes perfusate to flow from source 1140 and into pulmonary veins 1128.

In addition, vena cava 1126 of heart 1120 may be connected to a fluid conduit 1136 without interfacing through a connector 250 of sheet 202. Fluid conduit 1136 is in fluid communication with pump 1142 (through P2), thereby allowing perfusate to flow into or out of vena cava 1126.

After vena cava 1126 is connected to fluid system 228, perfusate flows through vena cava 1126 and fills the right atrium and the right ventricle. However, the right atrium and the right ventricle are also filled by the coronary sinus veins (not shown), which receive blood from the oblique vein of the left atrium (not shown). Accordingly, establishing a quick connection between vena cava 1126 and fluid system 228 using a connector 250 is not necessary. The coronary sinus veins will also fill the right atrium and the right ventricle using perfusate from the left atrium (which receives perfusate from the pulmonary veins 1128). Nonetheless, a variant (not shown) of sheet 202 may include an additional connector 250 for establishing a quick connection between vena cava 1126 and fluid system 228.

Figure 10D:
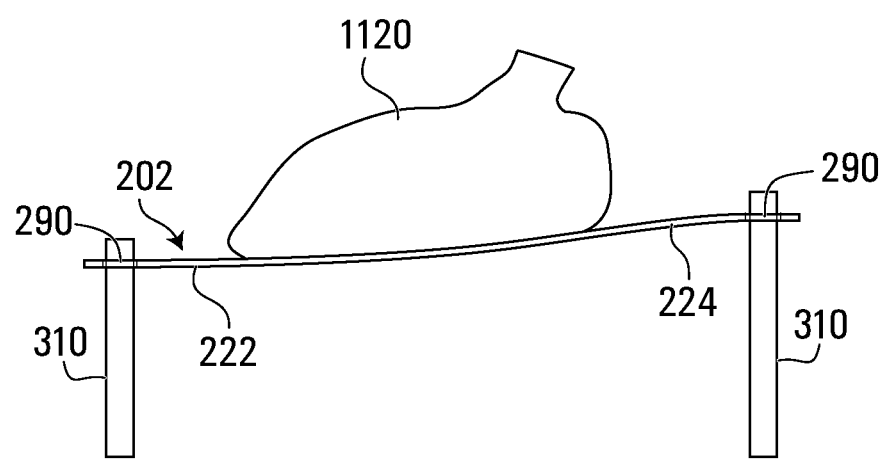
FIG. 10D is a side view of the support device of FIG. 2B during use in accordance with an example embodiment.

Before or after being connected to the fluid system 228, heart 1120 may be placed on upper side 204 of soft portion 222 of sheet 202. Due to the softness of the material of soft portion 222, the soft portion 222 will conform to the external shape of heart 1120 when heart 1120 is supported on sheet 202, as illustrated in FIG. 10D.

After being connected, heart 1120 may be perfused in "working mode". The term "working mode" refers to coronary perfusion throughout a heart by ventricular filling via the left atrium and ejection from the left ventricle via the aorta driven by the heart's contractile function and regular cardiac rhythm. In working mode, pump 1142 supplies perfusate to the right atrium via vena cava 1126 and to left atrium via pulmonary veins 1128 of heart 1120, via fluid conduits 1136 and 1138 respectively. Perfusate then flows from the right atrium into the right ventricle and out of pulmonary artery 1122, returning to source 1140 via fluid conduit 1132. Similarly, perfusate then flows from the left atrium into the left ventricle and out of aorta 1124, returning to source 1140 via fluid conduit 1134. Furthermore, sufficient pressure in aorta 1124 will lead to perfusion of the heart muscle through flow of conditioned perfusate into the coronary arteries of the heart. Further information in this regard is provided in WO 2013/106908 and in WO 2016/090498.

Heart 1120 may also be perfused in "resting mode". The term "resting mode" refers to a method of perfusing a heart with a nutrient-rich oxygenated solution in a reverse fashion via the aorta. The backwards pressure causes the aortic valve to shut thereby forcing the solution into the coronary arteries. "Resting mode" is also known as the preservation mode or the Langendorff perfusion. In resting mode, pump 1142 directs pressure into aorta 1124. As will be apparent to persons skilled in the art, suitable fluid pressure in the aorta 1124 will lead to flow of conditioned perfusate from fluid conduit 1134 into the coronary arteries, which branch off from the aorta 1124. If the pressure in aorta 1124 is sufficient, perfusate will move through the coronary arteries into capillary beds inside the walls of the heart, thereby providing oxygen and nutrients to the heart muscle. Perfusate will then move from the capillary beds into the coronary veins, moving carbon dioxide and wastes away from the heart muscle. The coronary veins empty into the right atrium of heart 1120, leading to a flow of perfusate from the right atrium, through the right ventricle, and into the pulmonary artery 1122. In this manner, perfusate containing carbon dioxide and wastes is moved into fluid subsystem 228 and returned to source 1140.

Organ perfusion kits may be provided and may include a support device 200 including sheet 202, a chamber 300, and external connectors for use with connectors 250 of sheet 202. The kits may include different components suitable for perfusion of a specific organ type (e.g. a heart, lungs, a kidney, or a liver). The external connectors may include a variety of external magnetic connectors (e.g. connectors 400, 400', 400") and cannulae (e.g. cannula 1004, cannula 824). In one example embodiment suitable for perfusion of a heart, a variety of external magnetic connectors are provided, including a first external magnetic connector suitable for connecting to an artery of the heart, a second external magnetic connector suitable for connecting to atrium of the heart, and a third external magnetic connector suitable for connecting to an aorta of the heart.

Figure 11:
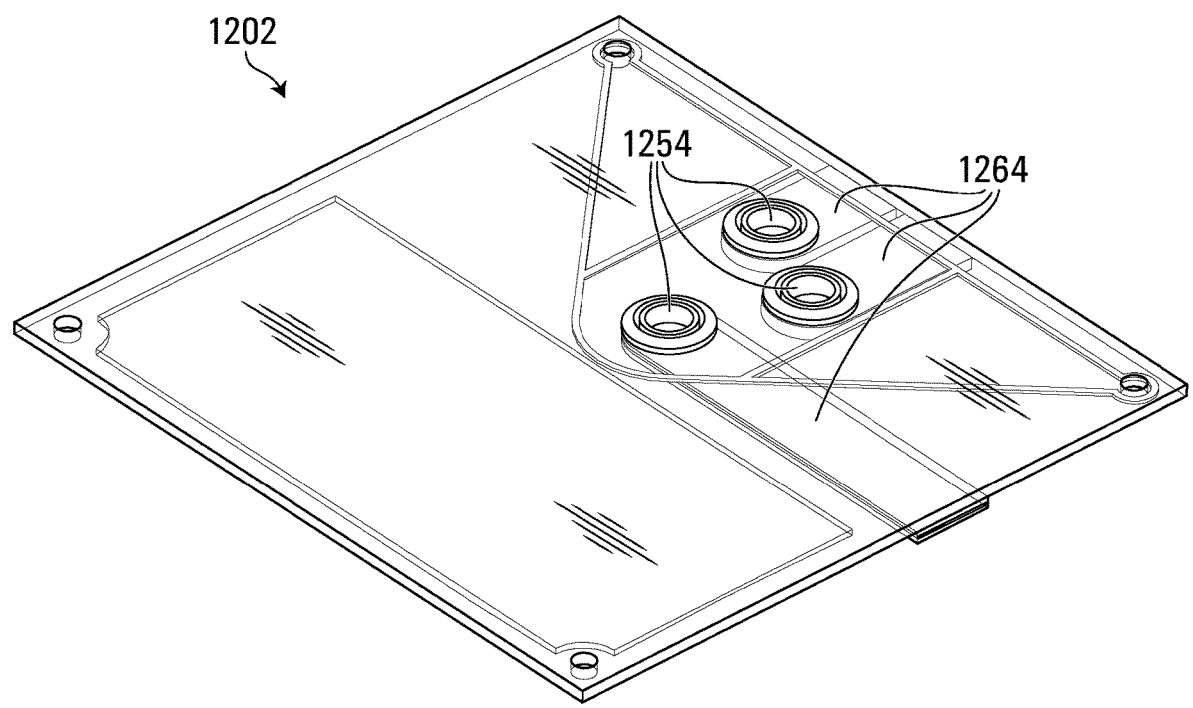
FIG. 11 is a top, front and right perspective view of a variant of the support device in accordance with an example embodiment.
Figure 12:
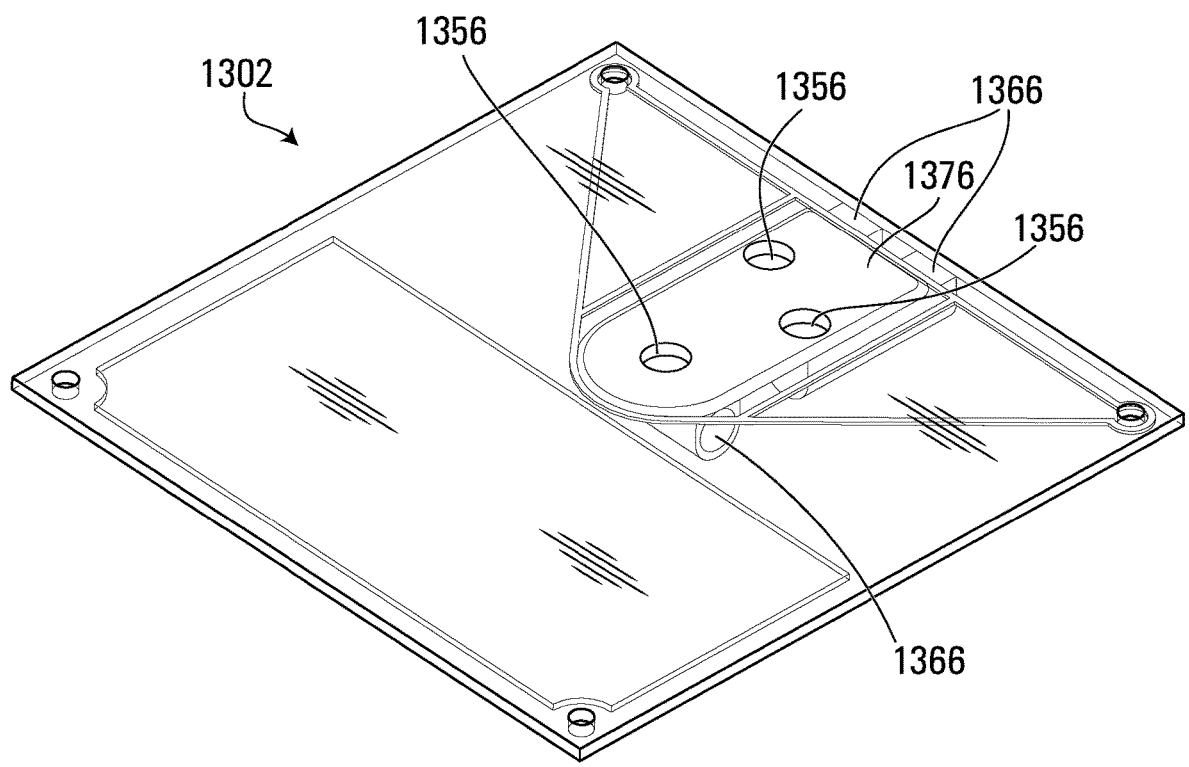
FIG. 12 is a top, front and right perspective view of a second variant of the support device in accordance with an example embodiment.

As will be apparent to a person of ordinary skill in the art, a sheet for use in supporting an organ during perfusion may have different types of connectors 250 as previously illustrated. For example, as illustrated in FIG. 11, a sheet 1202 has a plurality of mechanical couplers 1254, each being in fluid communication with a channel 1264. Mechanical couplers 1254 may be implemented in a manner similar to mechanical coupler 252, and channels 1264 may be implemented in a manner similar to channel 864. Similarly, as illustrated in FIG. 12, a sheet 1302 has a plurality of magnetic couplers 1356, each being in fluid communication with a conduit 1356. Magnetic couplers 1356 may be implemented in a manner similar to magnetic coupler 252, and conduits 1356 may be implemented in a manner similar to conduit 966. Further, magnetic or ferromagnetic material 1376 may surround all of the magnetic coupler 1356 in sheet 1302.

In some embodiments, one or more pressure sensors may be incorporated into a conduit or connector in the sheet of the support device. For example, a pressure sensor may be installed in a connector or cannula attached to the sheet.

Figure 13A:
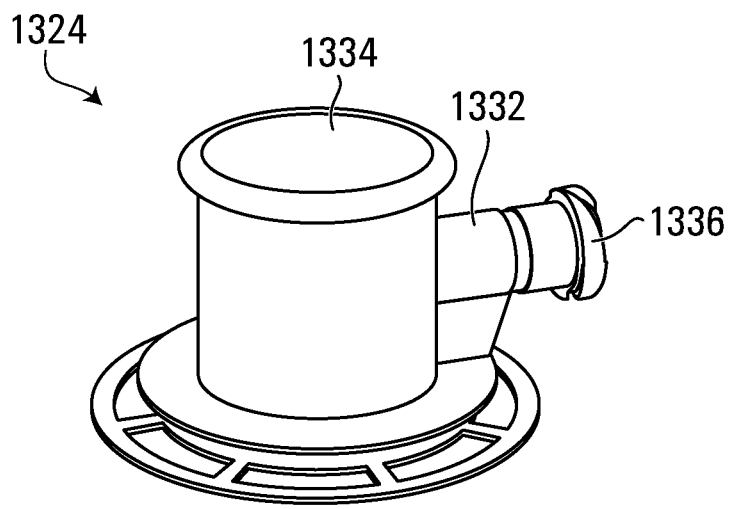
FIG. 13A is a perspective view of a cannula modified from the cannula of FIG. 8F with an added pressure sensor port.

In a particular example embodiment, cannula 824 may be modified to include a port for mounting a pressure sensor. The modified cannula is illustrated with cannula 1324 shown in FIG. 13A, which has a pressure sensor port 1332. One end of pressure sensor port 1332 is in fluid communication with the central fluid channel 1334 in cannula 1324. The other end 1336 of pressure sensor port 1332 is configured to be coupled to a pressure sensor to allow the pressure sensor be conveniently mounted on or in the pressure sensor port 1332. End 1336 of the pressure sensor port 1332 may have any suitable mating structure for engaging a desired pressure sensor. As illustrated, end 1336 may have a luer connector fitting structure. The luer structure may have a standard luer taper for convenient fitting with various types of pressure sensors, or even other sensors. The fitting may comply with an International Organization for Standardization (ISO) standard such as the ISO 80369 standard.

Figure 13B:
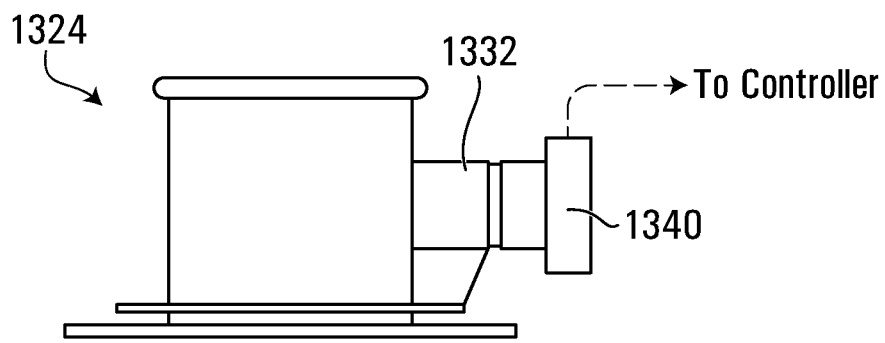
FIG. 13B is a side elevation view of the cannula of FIG. 13A with a pressure sensor coupled to the pressure sensor port.

As illustrated in FIG. 13B, a pressure sensor 1340, which has a corresponding coupling such as luer connector fitting structure, may be coupled to the pressure sensor port 1332. The mounted pressure sensor 1340 can detect and measure a fluid pressure in the fluid channel 1334 during use. Cannula 1324 may be configured and installed on the support sheet at a suitable location for connection with the aorta of a supported heart. Pressure sensor 1340 may be connected to a control system or a controller by wired or wireless connection for monitoring and controlling the pressure at the aorta.

Figure 14:
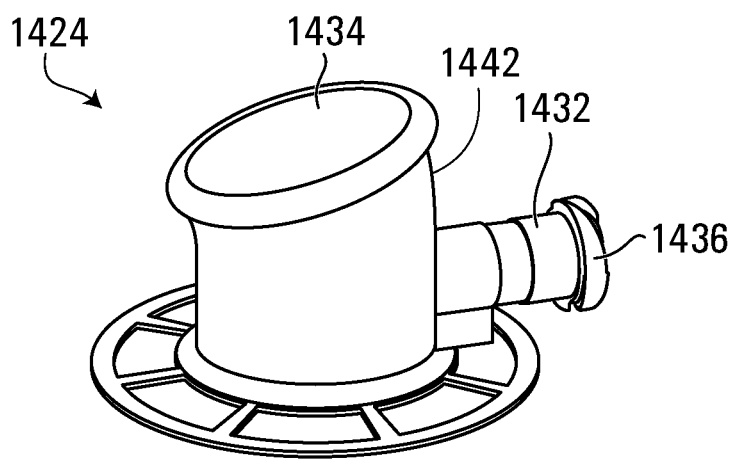
FIG. 14 is a perspective view of a variation of the cannula of FIG. 13A.

In another embodiment, a similar cannula 1424 as illustrated in FIG. 14 may be provided for connection with a pulmonary artery. The structure of cannula 1424 is similar to cannula 1324 and also includes a pressure sensor port 1432 in fluid communication with its fluid channel 1434 and having a luer connector end 1436 for coupling with a pressure sensor. However, cannula 1424 has been modified and configured, and may be positioned, for connecting with the pulmonary artery of the supported heart to measure the fluid pressure at the pulmonary artery. As illustrated, the top end portion 1442 of cannula 1424 may be slightly curved or bent, and shaped for more convenient connection with the pulmonary artery.

Of course, in these and other embodiments, pressure sensors or connection ports for pressure sensors may also be provided at other parts or locations on the support device.

The pressure sensors may be used to remotely measure and control the pressures in the fluid conduits embedded in the support sheet at various locations. The pressure sensors or ports for mounting the pressure sensors may be integrated into a support device described above. Suitable pressure sensors known to those skilled in the art may be used for this purpose.

In some embodiments, other types of sensors, such as one or more of flow rate meters, temperature sensors, or the like, may be included in or connected to one or more conduits in the sheet or cannulae attached to the sheet. These sensors may be used to monitor and control the fluid flows and the conditions of the fluid flowing through the conduits and connections provided by the sheet.

CONCLUDING REMARKS

Selected Embodiments of the present invention may be used in a variety of fields and applications. For example, they may have applications in transplantation surgery and research.

Other features, modifications, and applications of the embodiments described here may be understood by those skilled in the art in view of the disclosure herein.

It will be understood that any range of values herein is intended to specifically include any intermediate value or sub-range within the given range, and all such intermediate values and sub-ranges are individually and specifically disclosed.

The word "include" or its variations such as "includes" or "including" will be understood to imply the inclusion of a stated integer or groups of integers but not the exclusion of any other integer or group of integers.

It will also be understood that the word "a" or "an" is intended to mean "one or more" or "at least one", and any singular form is intended to include plurals herein.

It will be further understood that the term "comprise", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

Of course, the above described embodiments of the present disclosure are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A device for supporting and connecting an excised organ during perfusion, comprising:
   a resilient and flexible sheet having
      a first portion for contacting and supporting the organ thereon, and
      a second portion comprising an opening for forming a connection between the organ and a conduit to allow fluid communication between the conduit and the organ; and
   a magnetic material embedded in the second portion of the sheet for magnetically securing the connection between the conduit and the organ,
wherein the second portion is laterally arranged beside the first portion.

2. The device of claim 1, wherein the first portion comprises a first material having a first Shore hardness value, and the second portion comprising a second material having a second Shore hardness value, the first Shore hardness value being lower than the second Shore hardness value.

3. The device of claim 2, wherein the first Shore hardness value is selected from 00-20 to 00-50 to allow the first portion of the sheet to conform to an external shape of the organ when the organ is supported on the sheet.

4. The device of claim 3, wherein a section in the second portion of the sheet at the opening has a Shore hardness value higher than 0A, selected to limit distention of the section of the sheet under an applied fluid pressure in the opening.

5. The device of claim 1, wherein the sheet comprises a silicone.

6. The device of claim 1, wherein different portions of the sheet comprise different silicone materials having different Shore hardness values.

7. The device of claim 1, wherein the magnetic material comprises particulate magnets or ferromagnetic particulates dispersed around the opening for magnetically attracting a magnetic connector attached to the organ.

8. The device of claim 1, comprising a magnetic connector embedded in the sheet for coupling with an external magnetic connector.

9. The device of claim 8, wherein the magnetic connector embedded in the sheet comprises a flange mounted on or connectable to the conduit.

10. The device of claim 1, wherein the opening of the sheet comprises a first opening for receiving an end of a cannula connected to the organ, a second opening for fluid communication therethrough, and a fluid channel in the sheet connecting the first opening and the second opening.

11. The device of claim 10, wherein the sheet has a first side and a second side, the first opening is on the first side of the sheet and the channel extends between the first side and the second side within the sheet.

12. The device of claim 11, wherein the second opening is at an edge of the sheet between the first side and the second side.

13. The device of claim 1, wherein the sheet comprises a throughhole to allow a fluid tubing to pass therethrough.

14. The device of claim 1, wherein the sheet comprises a reinforcing frame in the second portion.

15. The device of claim 14, wherein the reinforcing frame comprises a urethane material.

16. The device of claim 1, wherein the organ is a heart, and the second portion of the sheet has a plurality of openings comprising a first opening for fluid communication with an aorta of the heart, a second opening for fluid communication with a pulmonary artery of the heart, and a third opening for fluid communication with an atrium of the heart.

17. The device of claim 1, wherein the connection comprises a cannula, the cannula comprising a pressure sensor or a port for coupling with the pressure sensor.

18. The device of claim 1, comprising a chamber, wherein the sheet is mounted inside the chamber, the chamber comprising a plurality of ports for connecting a plurality of fluid conduits to the organ supported on the sheet.

19. The device of claim 18, wherein the chamber comprises a plurality of mounting posts having different heights, and the sheet is mounted on the mounting posts and is inclined such that the first portion is lower than the second portion.

20. A kit comprising the device of claim 1, and a set of external magnetic connectors each configured for connecting with a respective cannula, wherein the set of magnetic connectors comprises a first connector for connecting with an artery of a heart, and a second connector for connecting with an atrium of the heart, and a third connector for connecting with an aorta of the heart.

* * * * *